(12) United States Patent
Lu et al.

(10) Patent No.: US 12,542,710 B2
(45) Date of Patent: Feb. 3, 2026

(54) OPTIMIZING CLUSTERS OF Wi-Fi NETWORKS

(71) Applicant: Plume Design, Inc., Palo Alto, CA (US)

(72) Inventors: Mowen Lu, Palo Alto, CA (US); Justin Katz, King of Prussia, PA (US); Manikanden Balakrishnan, San Mateo, CA (US); Sunil Ahuja, Mountain View, CA (US); Paul White, Burlingame, CA (US); William J. McFarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 17/982,031

(22) Filed: Nov. 7, 2022

(65) Prior Publication Data
US 2023/0065256 A1 Mar. 2, 2023

Related U.S. Application Data

(63) Continuation-in-part of application No. 17/723,657, filed on Apr. 19, 2022, which is a continuation of (Continued)

(51) Int. Cl.
*H04L 41/0806* (2022.01)
*H04L 41/0803* (2022.01)
(Continued)

(52) U.S. Cl.
CPC ...... *H04L 41/0806* (2013.01); *H04L 41/0803* (2013.01); *H04L 41/12* (2013.01);
(Continued)

(58) Field of Classification Search
None
See application file for complete search history.

(56) References Cited

U.S. PATENT DOCUMENTS

| 7,315,533 B2 | 1/2008 | Theobold et al. |
| 7,414,978 B2 | 8/2008 | Lun et al. |

(Continued)

OTHER PUBLICATIONS

Jun. 26, 2017 International Search Report for International Application No. PCT/US2017/023130.
Netgear, genie Mobile App., Mar. 2017, 202-11742-01, pp. 1-57.

*Primary Examiner* — Scott B Christensen
(74) *Attorney, Agent, or Firm* — Nicholas Martin; Greenberg Traurig, LLP

(57) ABSTRACT

Systems and methods for optimizing a cluster of Wi-Fi networks operating within a vicinity of each other are provided. In one implementation, a method includes detecting a cluster of Wi-Fi networks operating independently of each other, where the cluster is defined in that each Wi-Fi network includes a wireless transceiver configured to receive at least a minimum amount of signal power from one or more other wireless transceivers of one or more other Wi-Fi networks of the cluster. The method includes determining a plurality of Wi-Fi networks of the cluster that are enabled for cooperative optimization. Also, the method includes assigning a Wi-Fi channel selected from a plurality of available Wi-Fi channels to each of the wireless transceivers associated with the plurality of Wi-Fi networks enabled for cooperative optimization to reduce a total amount of potential interference in the cluster caused by the signal power received from independently-operated wireless transceivers.

16 Claims, 22 Drawing Sheets

Related U.S. Application Data application No. 16/905,065, filed on Jun. 18, 2020, now Pat. No. 11,310,106, which is a continuation of application No. 15/463,321, filed on Mar. 20, 2017, now Pat. No. 10,708,126.

(60) Provisional application No. 63/417,196, filed on Oct. 18, 2022, provisional application No. 62/310,617, filed on Mar. 18, 2016, provisional application No. 62/310,609, filed on Mar. 18, 2016, provisional application No. 62/310,603, filed on Mar. 18, 2016, provisional application No. 62/310,599, filed on Mar. 18, 2016, provisional application No. 62/310,596, filed on Mar. 18, 2016, provisional application No. 62/310,613, filed on Mar. 18, 2016, provisional application No. 62/310,589, filed on Mar. 18, 2016, provisional application No. 62/310,594, filed on Mar. 18, 2016, provisional application No. 62/310,598, filed on Mar. 18, 2016, provisional application No. 62/310,605, filed on Mar. 18, 2016.

(51) Int. Cl.

| | | |
|---|---|---|
| *H04L 41/12* | (2022.01) | |
| *H04L 41/16* | (2022.01) | |
| *H04L 67/02* | (2022.01) | |
| *H04W 12/06* | (2021.01) | |
| *H04W 12/062* | (2021.01) | |
| *H04W 24/08* | (2009.01) | |
| *H04W 84/12* | (2009.01) | |

(52) U.S. Cl.
CPC .............. *H04L 41/16* (2013.01); *H04L 67/02* (2013.01); *H04W 12/06* (2013.01); *H04W 12/062* (2021.01); *H04W 24/08* (2013.01); *H04W 84/12* (2013.01)

(56) References Cited

U.S. PATENT DOCUMENTS

| | | | |
|---|---|---|---|
| 7,953,403 B2 | 5/2011 | Nientiedt | |
| 8,781,487 B2 * | 7/2014 | Backes | H04W 60/00 455/452.2 |
| 8,798,021 B2 | 8/2014 | Mangalvedhe et al. | |
| 9,060,279 B2 | 6/2015 | Ganu et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,420,528 B2 | 8/2016 | Madan et al. | |
| 9,497,700 B2 | 11/2016 | Madan et al. | |
| 9,510,214 B1 | 11/2016 | Balasubramaniam et al. | |
| 9,516,579 B1 | 12/2016 | Diner et al. | |
| 10,057,813 B1 | 8/2018 | Likar et al. | |
| 11,792,782 B1 * | 10/2023 | Shattil | H04W 24/02 370/329 |
| 2006/0258395 A1 | 11/2006 | Cave et al. | |
| 2007/0149172 A1 | 6/2007 | Dickinson | |
| 2007/0206537 A1 | 9/2007 | Cam-Winget et al. | |
| 2007/0242621 A1 | 10/2007 | Nandagopalan et al. | |
| 2008/0139196 A1 * | 6/2008 | Zhang | H04W 24/08 455/423 |
| 2009/0257380 A1 | 10/2009 | Meier | |
| 2009/0279427 A1 | 11/2009 | Ji et al. | |
| 2009/0316585 A1 | 12/2009 | Srinivasan | |
| 2009/0323632 A1 | 12/2009 | Nix | |
| 2010/0029282 A1 | 2/2010 | Stamoulis et al. | |
| 2010/0232317 A1 | 9/2010 | Jing et al. | |
| 2011/0039554 A1 | 2/2011 | Bims | |
| 2011/0119370 A1 | 5/2011 | Huang et al. | |
| 2011/0151886 A1 | 6/2011 | Grayson et al. | |
| 2012/0002567 A1 | 1/2012 | Sun et al. | |
| 2012/0087268 A1 | 4/2012 | Savoor et al. | |
| 2012/0122503 A1 | 5/2012 | Ma et al. | |
| 2012/0257585 A1 | 10/2012 | Sydor et al. | |
| 2013/0201857 A1 | 8/2013 | Bhargava et al. | |
| 2013/0272285 A1 | 10/2013 | Goldsmith et al. | |
| 2014/0092765 A1 | 4/2014 | Agarwal et al. | |
| 2014/0126410 A1 | 5/2014 | Agarwal et al. | |
| 2014/0315593 A1 * | 10/2014 | Vrzic | H04W 52/40 455/522 |
| 2014/0321325 A1 | 10/2014 | Jing et al. | |
| 2014/0328190 A1 * | 11/2014 | Lord | H04W 24/08 370/252 |
| 2014/0341056 A1 * | 11/2014 | Carbajal | H04W 24/08 370/252 |
| 2015/0023183 A1 | 1/2015 | Ilsar et al. | |
| 2015/0117210 A1 * | 4/2015 | Yang | H04W 24/02 370/235 |
| 2015/0156794 A1 * | 6/2015 | Kwon | H04L 25/0224 370/329 |
| 2015/0215832 A1 | 7/2015 | Fitzpatrick | |
| 2015/0341797 A1 | 11/2015 | Madan et al. | |
| 2016/0080949 A1 | 3/2016 | Chandrasekhar et al. | |
| 2016/0088631 A1 * | 3/2016 | Hedayat | H04B 7/063 370/329 |
| 2017/0026936 A1 * | 1/2017 | Jiang | H04W 24/08 |
| 2017/0245304 A1 * | 8/2017 | Andreoli-Fang | H04B 17/345 |
| 2017/0272317 A1 * | 9/2017 | Singla | H04L 41/16 |
| 2018/0254955 A1 | 9/2018 | Ranjan et al. | |
| 2019/0312779 A1 * | 10/2019 | Magzimof | H04L 41/0894 |

\* cited by examiner

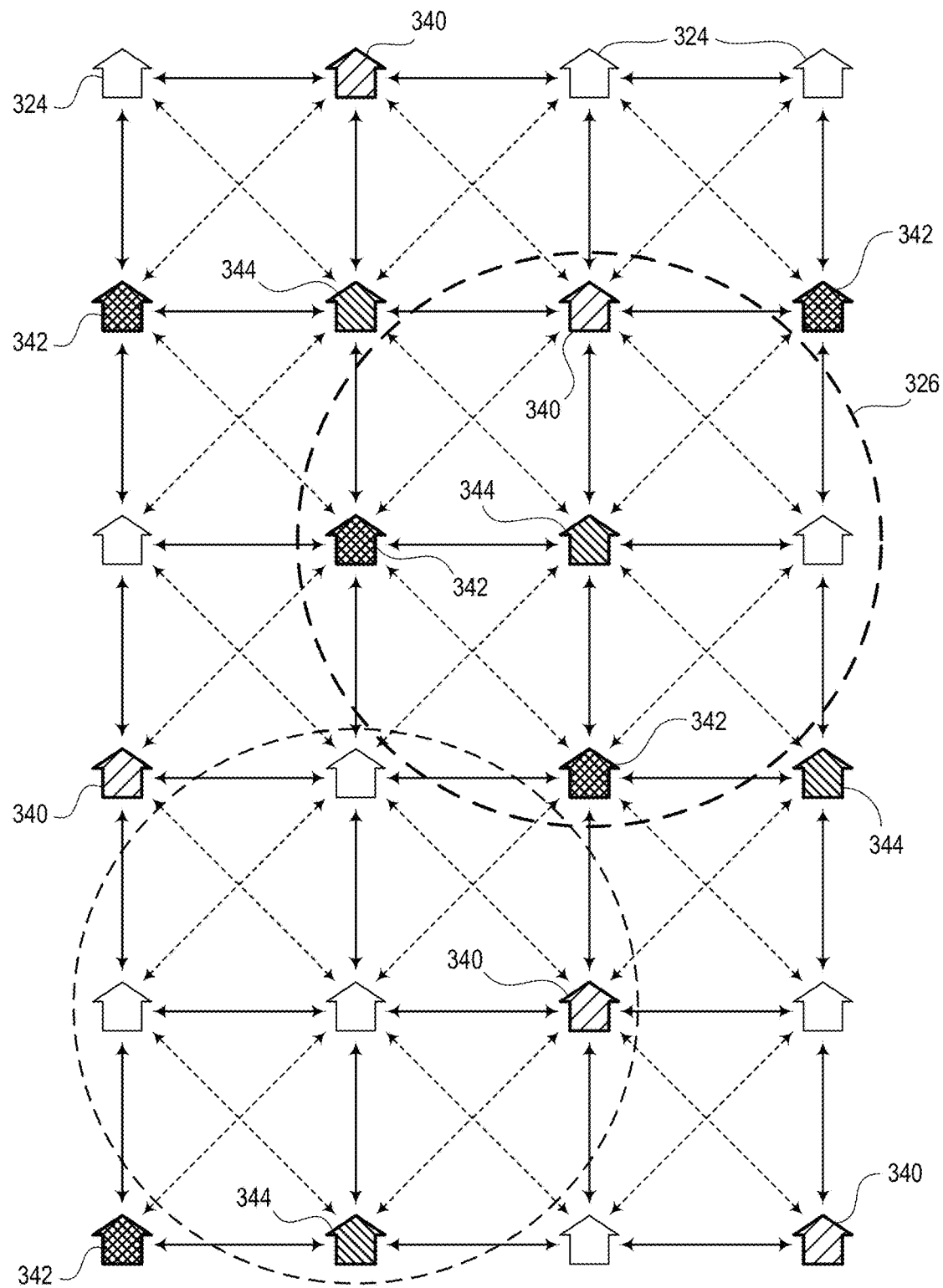
FIG. 16
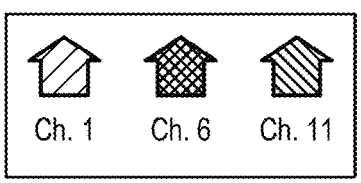

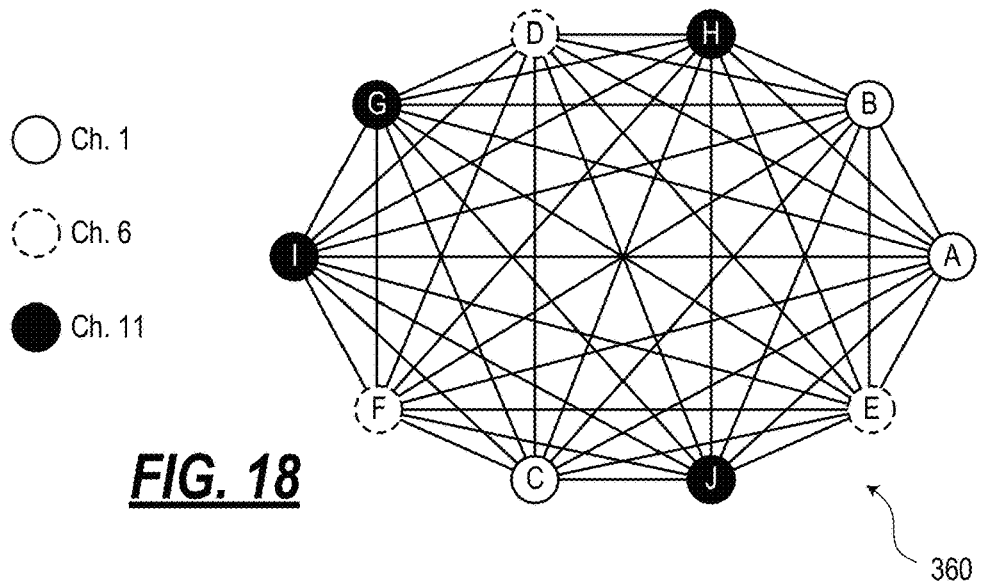
FIG. 18
| NODES | CHANNEL | LOAD | INTER-FERENCE |
|---|---|---|---|
| A, B, C | 1 | 10% | 40% |
| D, E, F | 6 | 0% | 40% |
| G, H, I, J | 11 | 0% | 10% |
FIG. 19
| CH. | EXTERNAL INTERFERENCE |
|---|---|
| 1 | 20% |
| 6 | 40% |
| 11 | 10% |
FIG. 20
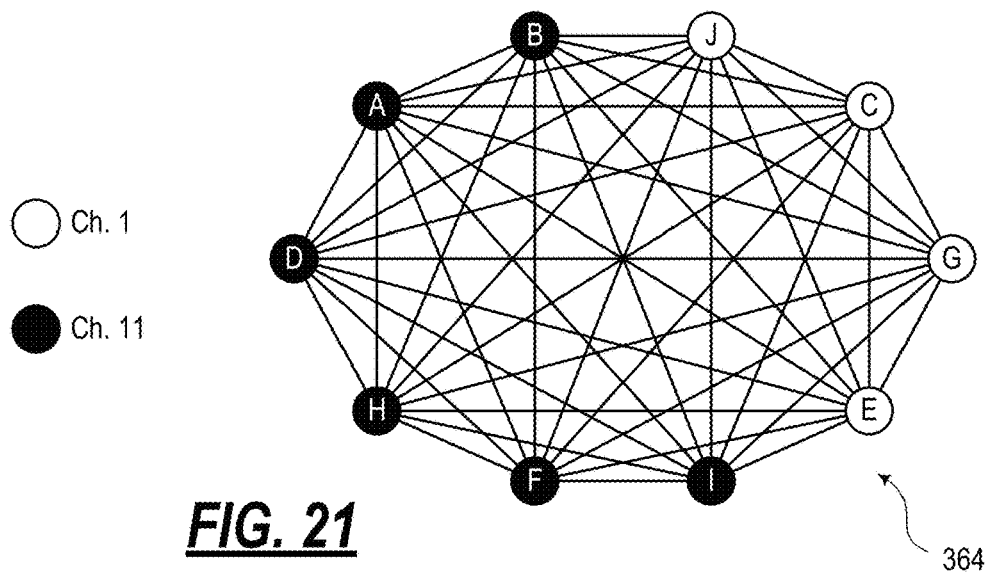
FIG. 21

OPTIMIZING CLUSTERS OF Wi-Fi NETWORKS

CROSS-REFERENCE TO RELATED APPLICATIONS

The present disclosure claims priority to U.S. Provisional Patent Application No. 63/417,196, filed Oct. 18, 2022. Also, the present disclosure is a continuation-in-part of U.S. patent application Ser. No. 17/723,657, filed Apr. 19, 2022, which is a continuation of U.S. patent application Ser. No. 16/905,065, filed Jun. 18, 2020, which is now U.S. Pat. No. 11,310,106, issued Apr. 19, 2022, and which was a continuation of U.S. patent application Ser. No. 15/463,321, filed Mar. 20, 2017, which is now U.S. Pat. No. 10,708,126, issued Jul. 7, 2020, and which claimed priority to the following U.S. Provisional Patent Applications all filed on Mar. 18, 2016, all of which are incorporated by reference in their entirety.

| Ser. No. | Title |
| --- | --- |
| 62/310,589 | DATA GATHERING TO ENABLE THE OPTIMIZATION OF DISTRIBUTED WI-FI NETWORKS |
| 62/310,594 | DISTRIBUTED WI-FI SETUP |
| 62/310,596 | OPTIMIZATION OF DISTRIBUTED WI-FI NETWORKS |
| 62/310,598 | CLAIMING NETWORKING DEVICES FOR A HOME NETWORK |
| 62/310,599 | L2 NETWORK TUNNELS FOR WI-FI CLIENT BRIDGING |
| 62/310,603 | METHODS FOR CHANGING TOPOLOGY AND FIRMWARE IN DISTRIBUTED WI-FI NETWORKS |
| 62/310,605 | OPTIMIZATION ON MULTIPLE TIMESCALES IN A DISTRIBUTED WI-FI SYSTEM |
| 62/310,609 | CONTROLLING CLIENTS IN DISTRIBUTED WI-FI NETWORKS |
| 62/310,613 | OPTIMIZATION OF DISTRIBUTED WI-FI NETWORKS ESTIMATION AND LEARNING |
| 62/310,617 | DISTRIBUTED WI-FI NETWORK VISUALIZATION AND TROUBLESHOOTING |

FIELD OF THE DISCLOSURE

The present disclosure generally relates to wireless networking systems and methods, such as Wi-Fi networks. More particularly, the present disclosure relates to optimizing clusters of Wi-Fi networks by reducing or minimizing channel interference among closely located Wi-Fi networks in each cluster.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Also, with multiple Wi-Fi networks operating independently in a relatively small space, such as independent Wi-Fi networks in an apartment complex, Wi-Fi channels from one Wi-Fi network may interfere with the Wi-Fi channels of a nearby Wi-Fi network. Therefore, there is a need to accommodate clusters of Wi-Fi networks operating in an area to enable cooperative optimization to reduce potential interference.

BRIEF SUMMARY OF THE DISCLOSURE

Systems and methods may be configured for optimizing Wi-Fi networks in a cluster. For example, methods may be executed to assign channels in such a way so as to reduce potential signal interference among nearby Wi-Fi systems for optimization. In one implementation, a method includes the step of detecting a cluster of Wi-Fi networks operating independently of each other. The cluster is defined in that each Wi-Fi network includes a wireless transceiver configured to receive at least a minimum amount of signal power from one or more other wireless transceivers of one or more other Wi-Fi networks of the cluster. The method also includes the step of determining a plurality of Wi-Fi networks of the cluster that are enabled for cooperative optimization. Also, the method includes the step of assigning a Wi-Fi channel selected from a plurality of available Wi-Fi channels to each of the wireless transceivers associated with the plurality of Wi-Fi networks enabled for cooperative optimization to reduce a total amount of potential interference in the cluster caused by the signal power received from independently-operated wireless transceivers.

The method, for example, may be executed by any suitable control device, such as a cloud-based server or Software-Defined Networking (SDN) controller. The cloud-based server or SDN controller, for example, may be configured to receive, from each Wi-Fi network, identification information of the respective Wi-Fi network and identification information and signal power levels associated with other Wi-Fi networks within range of the respective Wi-Fi network. The cloud-based server or SDN controller may be configured to manage multiple clusters to reduce the total amount of potential interference in each cluster caused by the signal power received from the independently-operated wireless transceivers in the respective cluster. The cloud-based server or SDN controller may be configured to reduce the total amount of potential interference in each cluster further caused by the signal power received from wireless transceivers in other clusters.

In some embodiments, the step of assigning Wi-Fi channels may include the steps of obtaining usage parameters associated with each of the Wi-Fi networks in the clusters, the usage parameters including a) an amount of time that the respective Wi-Fi network is used during a predetermined time period, b) a load of data traffic is transmitted within the respective Wi-Fi network during the predetermined time period, and/or c) the times of day when the respective Wi-Fi network is used. The assigning step may then be based on these usage parameters to further reduce the total amount of potential interference in the cluster.

Also, the method may further be defined in some embodiments whereby each Wi-Fi network represents a node associated with an independent residence and each Wi-Fi network includes one or more access points. The method may include performing a sequential step of optimizing each independent residence by assigning channels for each of the one or more access points to reduce a total amount of interference within the respective independent residence. The step of determining the plurality of Wi-Fi networks of the cluster that are enabled for cooperative optimization may be performed independently of what service provider is associated with each of the Wi-Fi networks of the cluster.

For each pair of adjacent wireless transceivers in the cluster, the method may further is the steps of a) obtaining, from each wireless transceiver of the respective pair of adjacent wireless transceivers, the signal power received from the other wireless transceiver, b) averaging the received signal power of the respective pair, and c) comparing the average with the minimum amount to determine if the received signal power is capable of causing interference between the respective pair. The minimum amount, for example, may be related to a predetermined lower threshold of a metric associated with one or more of a Received Signal Strength Indicator (RSSI), a dBm reading, and a pain metric.

The step of assigning the Wi-Fi channels to each of the wireless transceivers may further include the steps of a) selecting a primary wireless transceiver from the plurality of wireless transceivers, b) assigning a first Wi-Fi channel to the primary wireless transceiver, c) assigning one or more different Wi-Fi channels to wireless transceivers within range of the primary wireless transceivers, and d) repeating channel assignments for additional wireless transceivers. The primary wireless transceiver may be selected based on one or more of a) network usage with respect to other wireless transceivers, b) a number of other wireless transceivers from which at least the minimum amount of signal power is received, and c) a nearness to a geographical center of the cluster.

The step of detecting the cluster may further include the step of balancing a size of the cluster by defining a minimum number of edges that a Wi-Fi network shares with other Wi-Fi networks and by defining the minimum amount of signal power received at each edge. Also, in response to determining that the cluster size is above an upper threshold, the method may perform one or more of the steps of a) increasing the minimum amount of signal power considered to potentially cause interference, b) dividing the cluster into two or more sub-clusters based on locations within the cluster where there are fewer edges, c) dividing the cluster into two or more sub-clusters based on manual input and/or geographical information, etc. In response to determining that the cluster size is below a lower threshold, the method may perform the step of reducing the minimum amount of the signal power considered to potentially cause interference.

In some embodiments, the method may also be defined whereby the plurality of available Wi-Fi channels may include multiple channels from a 2.4 GHz band and a 5 GHz band. The 2.4 GHz band may include at least three channels having minimal overlapping. The step of assigning a Wi-Fi channel to each of the wireless transceivers may further include a graph-coloring technique. The method may be further configured to re-assign Wi-Fi channels based on updated information regarding received signal power and additions or subtractions of Wi-Fi networks in the cluster.

BRIEF DESCRIPTION OF THE DRAWINGS

The present disclosure is illustrated and described herein with reference to the various drawings, in which like reference numbers are used to denote like system components/method steps, as appropriate, and in which:

FIG. 16 is a graph showing the homes arranged as in FIG. 15, where different channels are assigned to reduce potential signal interference throughout the cluster.

FIG. 18 is a graph showing a cluster of ten nodes in an original arrangement, where each node experiences potential signal interference from each of the other nodes, and where three different channels for Wi-Fi operation at 2.4 GHz are used.

FIG. 19 is a table showing an example of results of the operation of the cluster of FIG. 18.

FIG. 20 is a table showing an estimate of external interferences with respect to the three channels.

FIG. 21 is a graph showing the cluster of FIG. 18 where the channels are re-assigned according to one optimization process based on the estimates from the table of FIG. 20.

DETAILED DESCRIPTION OF THE DISCLOSURE

Again, in various embodiments, the present disclosure relates systems and methods for optimizing a cluster of Wi-Fi networks to reduce the overall potential interference that may occur as a result of the Wi-Fi networks operating within range of each other and transmitting wireless signals at such a level where other nearby Wi-Fi networks may normally be affected. For example, one method may include detecting a cluster of Wi-Fi networks operating independently of each other, whereby the cluster is defined in that each Wi-Fi network includes a wireless transceiver configured to receive at least a minimum amount of signal power from one or more other wireless transceivers of one or more other Wi-Fi networks of the cluster. The method may also include determining a plurality of Wi-Fi networks of the cluster that are enabled for cooperative optimization, such as those Wi-Fi networks (e.g., having Wi-Fi equipment provided by a common vendor) that are configured to participate in the optimization techniques described herein. Next, the method may include assigning a Wi-Fi channel selected from a plurality of available Wi-Fi channels to each of the wireless transceivers associated with the plurality of Wi-Fi networks enabled for cooperative optimization to reduce a total amount of potential interference in the cluster caused by the signal power received from independently-operated wireless transceivers.

The optimization systems and methods receive inputs from the distributed Wi-Fi system, perform optimization, and provide outputs including operational parameters for the distributed Wi-Fi system. The inputs can include a plurality of traffic loads required by each Wi-Fi client device, signal strength and data rate for each possible link, packet error rates on each link, strength and load of in network interferers, and strength and load of out of network interferers. The outputs can include a plurality of channel and bandwidth (BW) selection, routes and topology, Request to Send/Clear to Send (RTS/CTS) settings, Transmitter (TX) power, clear channel assessment, client association steering, band steering, QoS parameters including Enhanced Distributed Coordination Function (EDCF) priority and Arbitration Inter-Frame Spacing (AIFS), and Wi-Fi contention window settings. The optimization can be based on the inputs to maximize an objective function that can be defined in a wide variety of ways, to reflect real world performance and usage preferences. In particular, an objective function that maximizes excess capacity for a load ratio considering a load desired by each Wi-Fi client device is beneficial. The optimization objective can also include a penalty for new topologies that would be disruptive to the operation of the Wi-Fi network to implement. The outputs of the optimizer can include operational parameters for the Wi-Fi system based on the optimization.

Distributed Wi-Fi System

Figure 1:
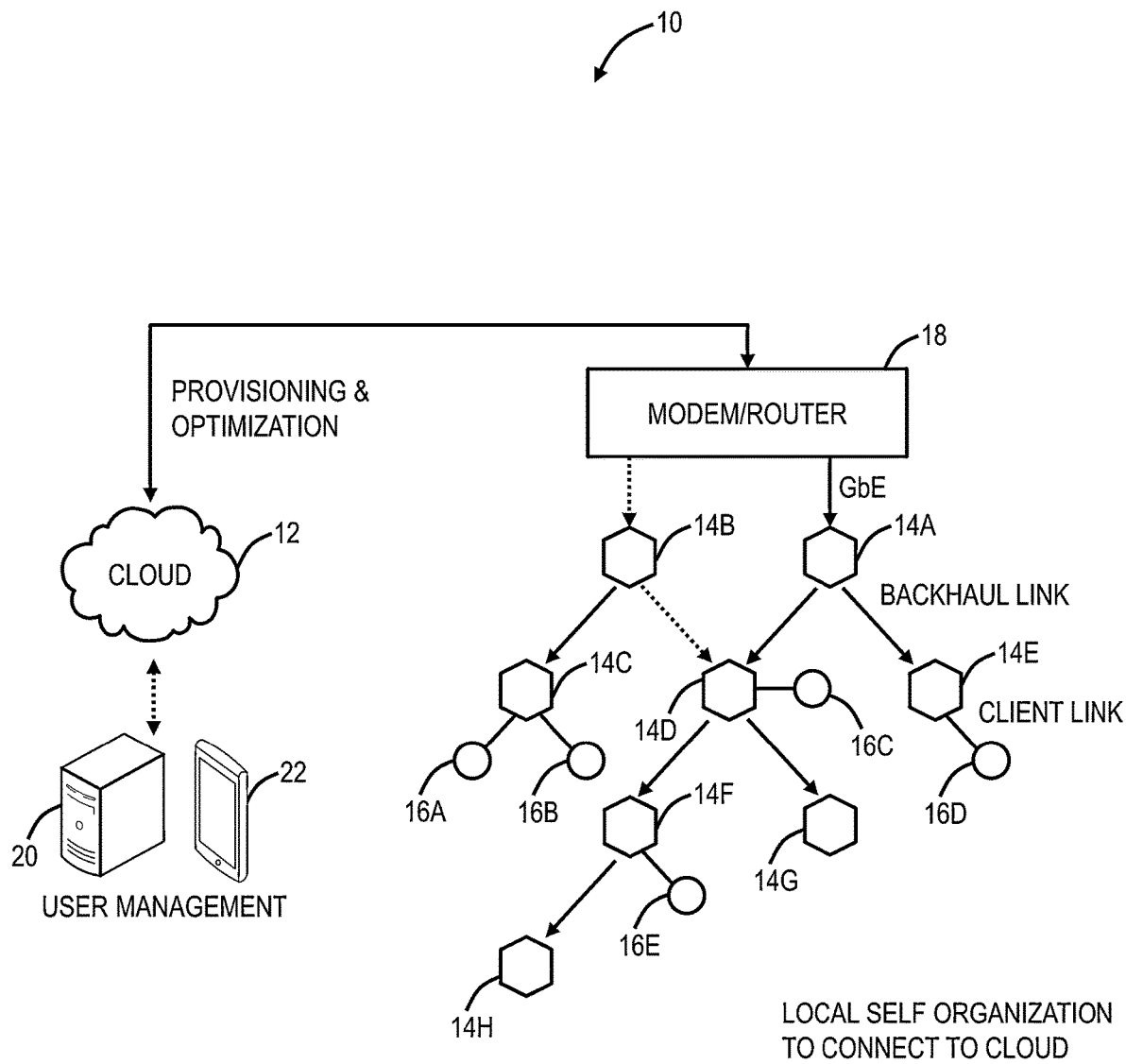
FIG. 1 is a network diagram of a distributed Wi-Fi system with cloud-based control.

FIG. 1 is a network diagram of a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an example gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi system compared to conventional Wi-Fi systems

Figure 2:
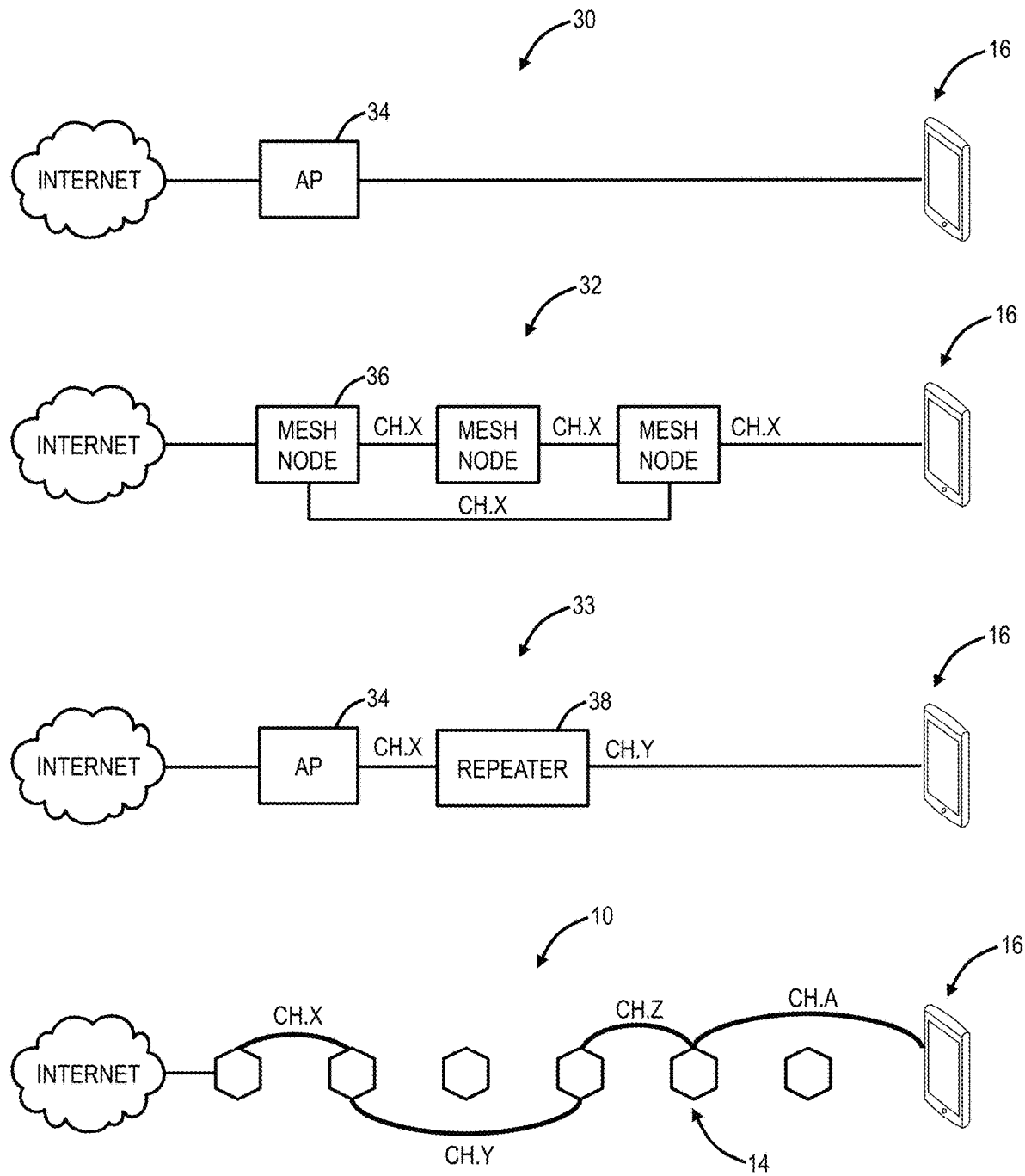
FIG. 2 is a network diagram of differences in operation of the distributed Wi-Fi system of FIG. 1 relative to a conventional single access point system, a Wi-Fi mesh network, and a Wi-Fi repeater system.

FIG. 2 is a network diagram of differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Channels X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 200 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an aspect, the servers 20 in the cloud 12 are configured to optimize channel selection for the best user experience.

Configuration and optimization process for the distributed Wi-Fi system

Figure 3:
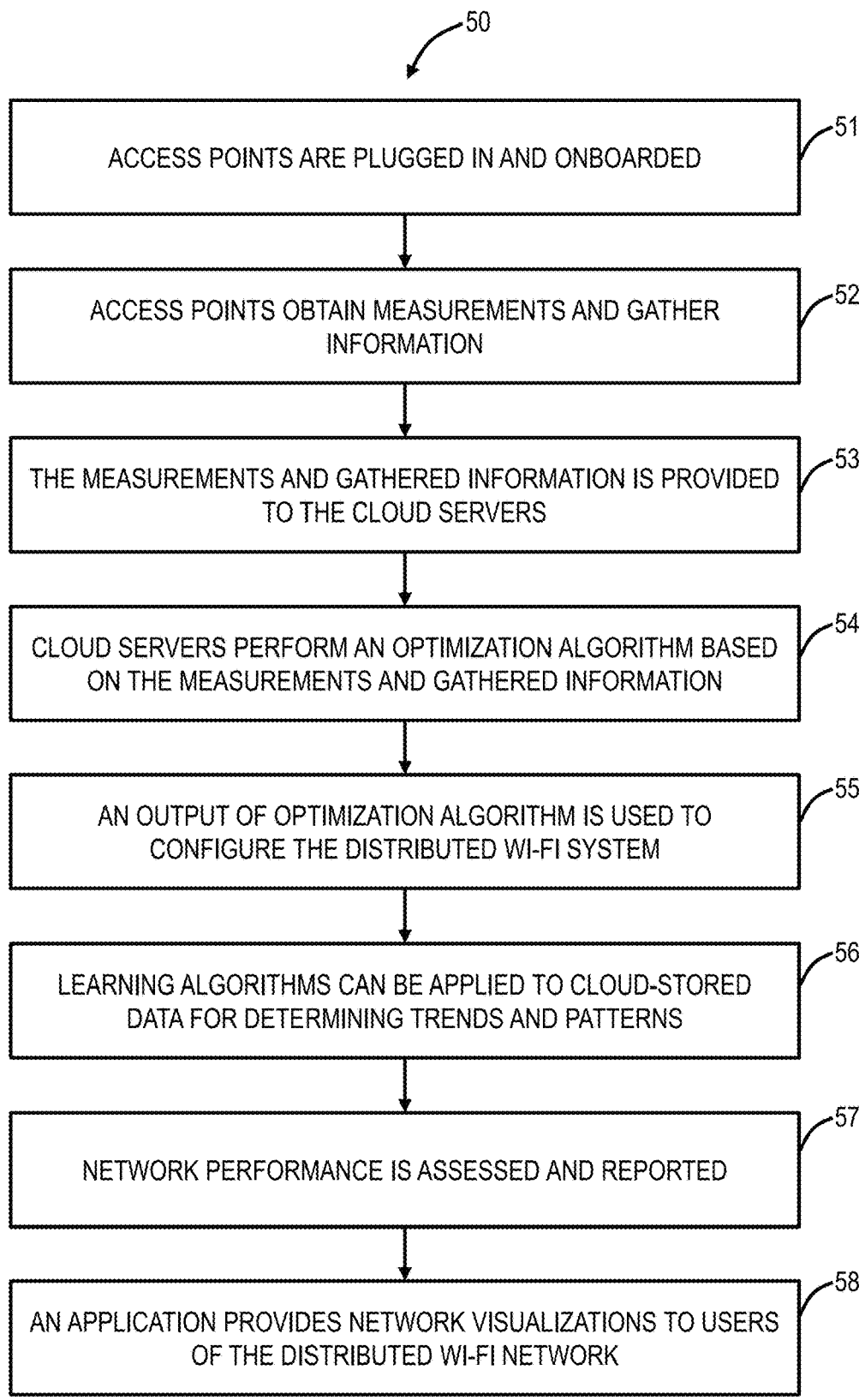
FIG. 3 is a flowchart of a configuration and optimization process for the distributed Wi-Fi system of FIG. 1.

FIG. 3 is a flowchart of a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an embodiment, the onboarding step 51 is performed with Bluetooth or equivalent connectivity between the access point 14 and a user device 22 allowing a user to provide the SSID, security keys, etc. Once onboarded, the access point 14 can initiate communication over the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link were loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth) and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an example embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Figure 4:
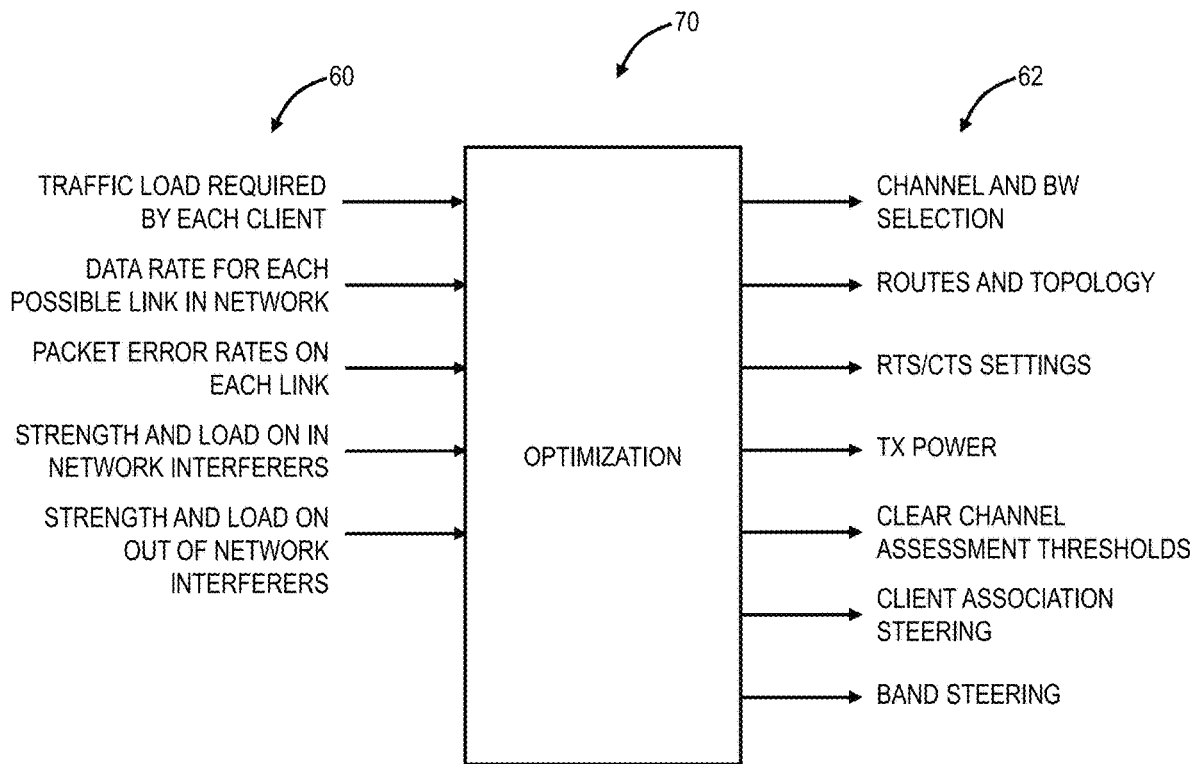
FIG. 4 is a block diagram of inputs and outputs to an optimization as part of the configuration and optimization process of FIG. 3.

FIG. 4 is a block diagram of inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
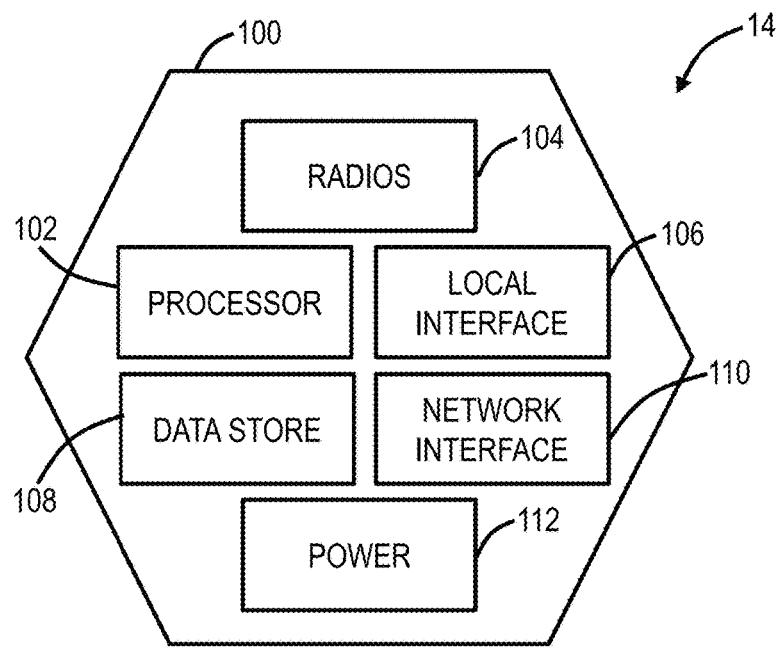
FIG. 5 is a block diagram of functional components of the access point in the distributed Wi-Fi system of FIG. 1.

FIG. 5 is a block diagram of functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The radios 104 may be used to enable the access point 14 communicate to the modem/router 18. Also, the radios 104 can be used to provide local connectivity to a Wi-Fi client device 16 or user device 22. For example, wiring in a device to an access point 14 can provide network access to a device which does not support Wi-Fi. In an embodiment, all of the access points 14 in the distributed Wi-Fi system 10 include the network interface 110. In another embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 200 via the cloud. The processor 102 and the data store 108 may be configured to implement the various processes, algorithms, methods, techniques, etc. described herein.

Cloud Server and User Device

Figure 6:
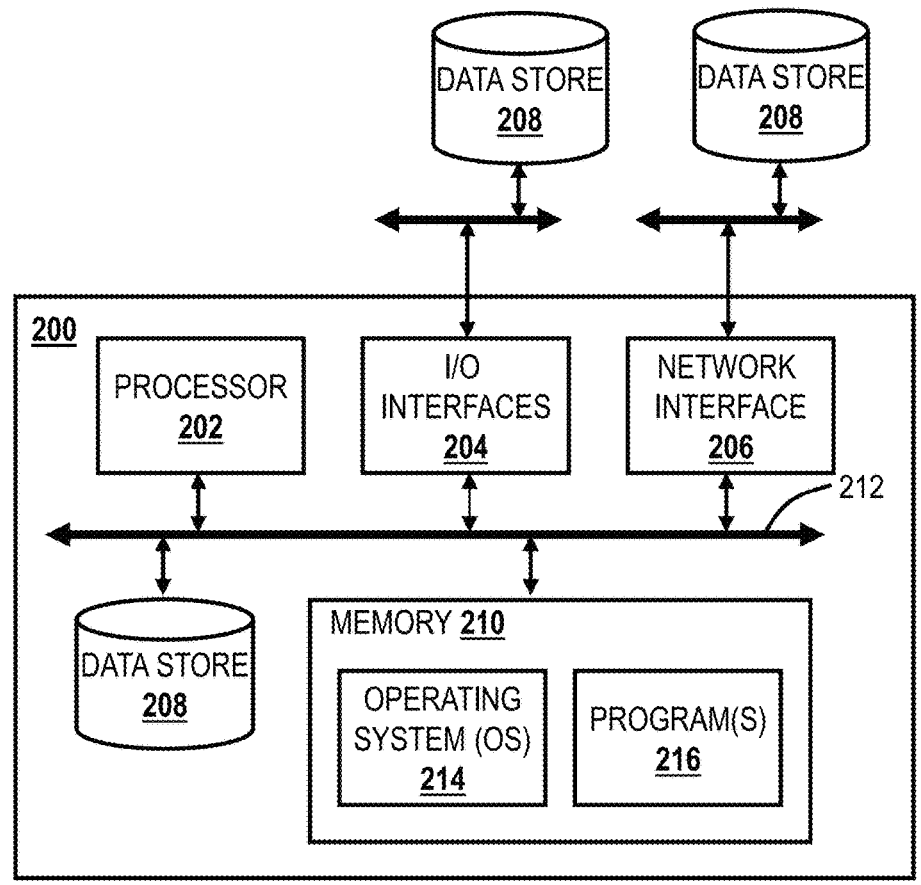
FIG. 6 is a block diagram of functional components of a server, a Wi-Fi client device, or a user device which may be used with the distributed Wi-Fi system of FIG. 1.

FIG. 6 is a block diagram of functional components of a server 200 (e.g., the server 20, the Wi-Fi client device 16, the user device 22, etc.) which may be used with the distributed Wi-Fi system 10. FIG. 6 illustrates functional components which can form any of the Wi-Fi client device 16, the server 20, the user device 22, or any general processing device. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Optimization of Distributed Wi-Fi Networks Over Multiple Timescales

Figure 7:
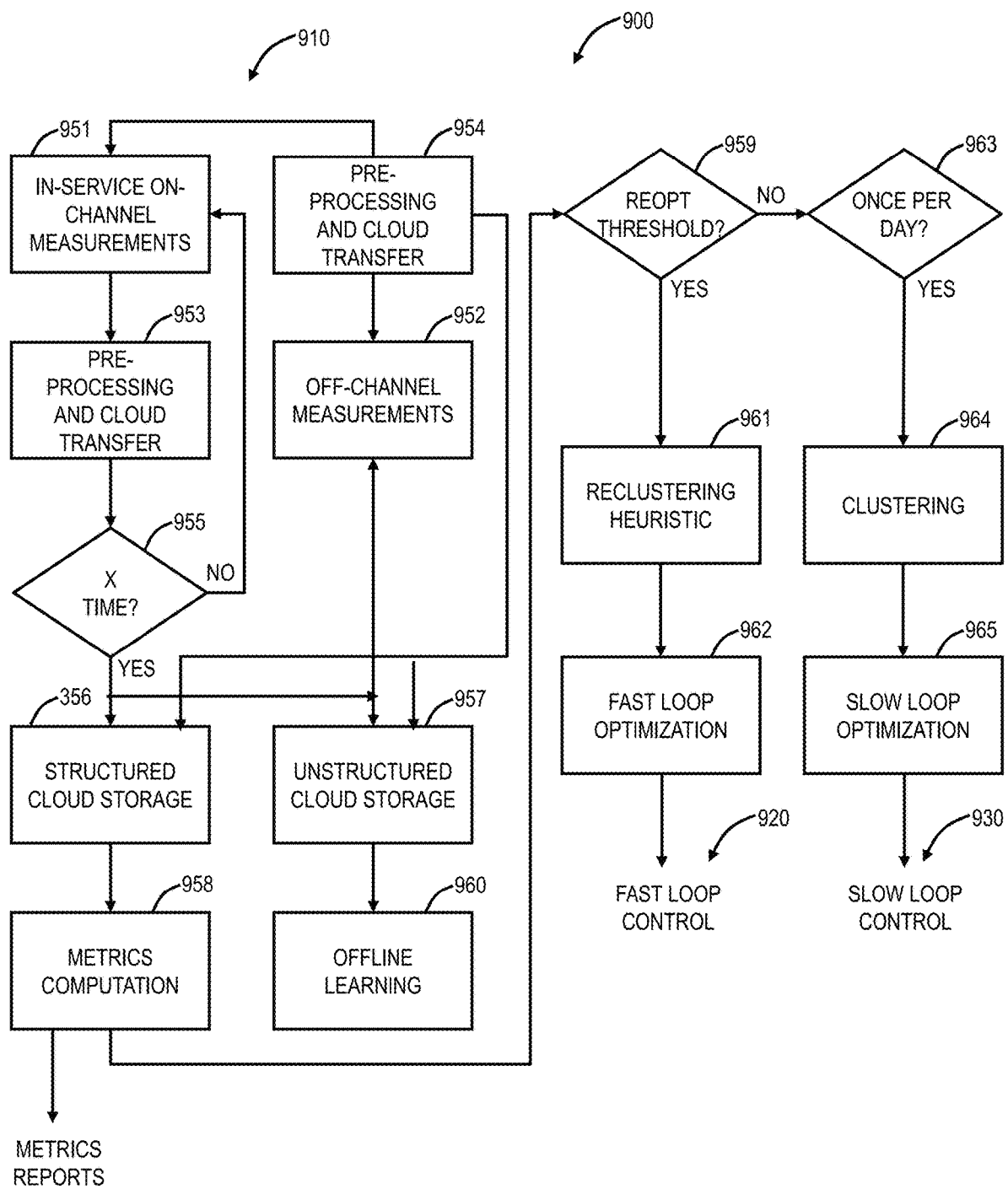
FIG. 7 is a flowchart of an optimization method for a distributed Wi-Fi network performed over multiple timescales.
Figure 8:
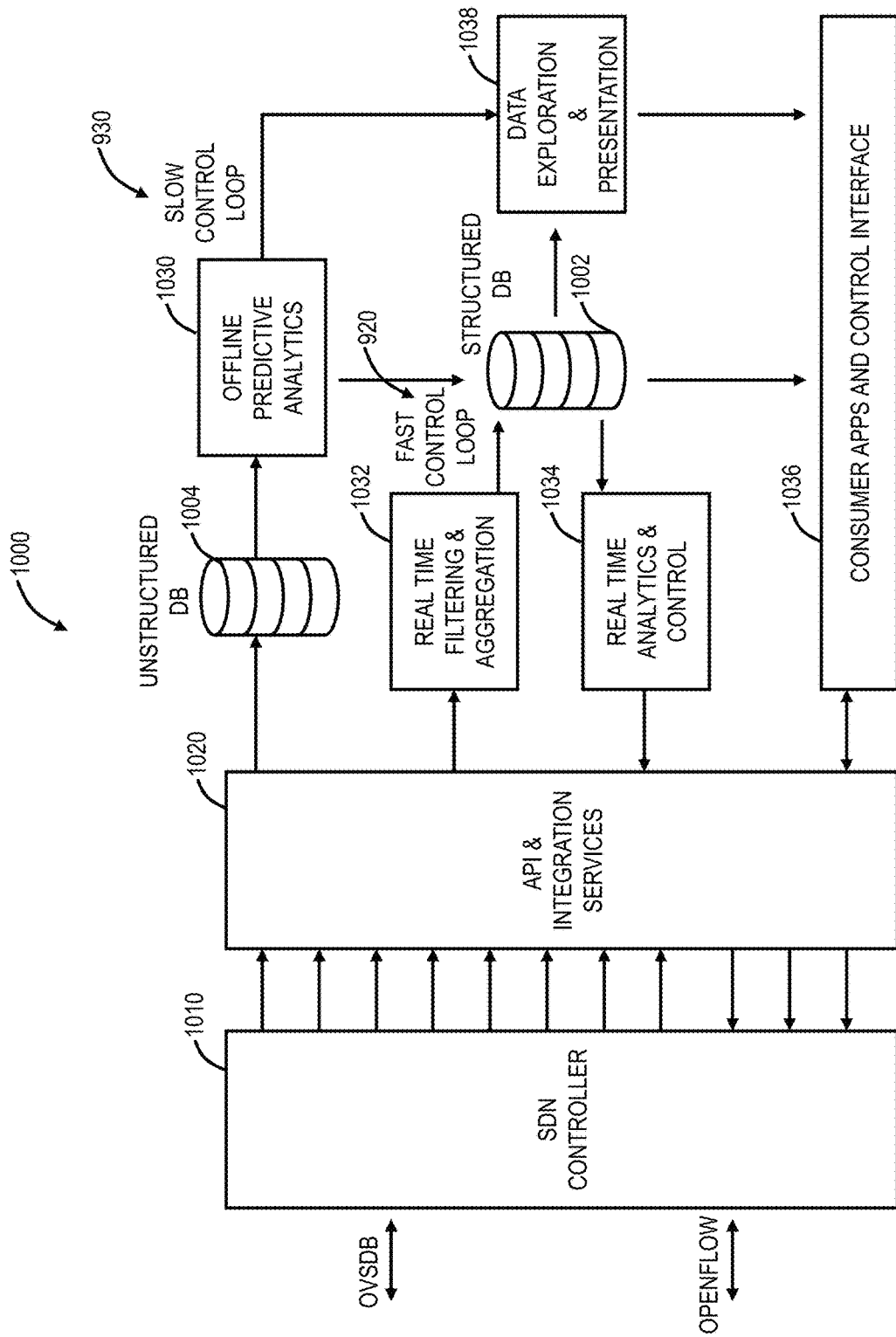
FIG. 8 is a block diagram of a cloud system for implementing the slow and fast control loops associated with the optimization.

FIG. 7 is a flowchart of an optimization method 900 for a distributed Wi-Fi network performed over multiple timescales. FIG. 8 is a block diagram of a cloud system 1000 for implementing the slow and fast control loops associated with the optimization 900. The optimization method 900 contemplates operation by the cloud system 1000 (i.e., a cloud service, cloud controller, etc.) to optimize any distributed Wi-Fi network. Again, a distributed Wi-Fi network can include the distributed Wi-Fi system 10, the Wi-Fi mesh network 32, the Wi-Fi repeater network 33, etc. As described herein, the distributed Wi-Fi network includes multiple interconnected nodes in a topology which can be adjusted based on the optimization 70. The topology is formed by a plurality of backhaul links which wirelessly connect the access points 14 to one another. The optimization 70 can be performed periodically to determine an optimal topology in terms of node connectivity, radio (2.4 G/5 G), channel, channel width, etc.

The optimization method 900 includes data collection steps 910, a fast control loop 920, and a slow control loop 930. The optimization method 900 performs the optimization 70 over multiple timescales including proactive long-term optimization (the slow loop control 930) and short-term optimization (the fast loop control 920). The slow loop control 930 is performed periodically. One advantage to the slow optimization loop is that its result does not need to be applied immediately. Rather, the result of the slow loop optimization can be applied at times when the load on the Wi-Fi network is low. Further, the slow loop optimization itself can be performed on a scheduled basis or delayed until it is convenient to do the optimization. For example, the optimization could be delayed until the load on compute resources is lower, or compute costs are lower. The long-term optimization in the slow loop control 930 is based on trend behavior that does not fluctuate rapidly. The long-term optimization in the slow loop control 930 is complemented by the short-term optimization (the fast loop control 930) that adapts the Wi-Fi network to fluctuations around the long-term forecasts on finer timescales. An advantage to the short-term optimization is that it can be in reaction to quickly changing network conditions, and therefore can be applied very soon after the optimization is completed. The fast loop control 920 and the slow control loop 930 can use different objective function weightings regarding an amount of disruption to the Wi-Fi network a particular new set of network parameters would cause.

The data collection steps 910 include in-service on-channel measurements 951 where the access points 14 collect measurements and statistics on the home channel on which it is operating and off-channel measurements 952 where the access points 14 can periodically switch off of the home channel and measure other channels (i.e., channels other than the home channel). The data collection steps 910 can include pre-processing of the data and cloud transfer (steps 953, 954) where the data (measurements, statistics, etc.) are provided from the access points 14 to the cloud system 1000. The measurements can be obtained periodically (step 955).

The measurements can be stored in the cloud system 1000 in structured cloud storage in a structured database 1002 (step 356) and in unstructured cloud storage in an unstructured database 1004 (step 957). The structured cloud storage can be used to compute metrics (step 958) which can be reported and/or used to determine a re-optimization threshold (step 959). The unstructured storage can be used for offline learning (step 960) such as using big data analytics, machine learning, etc.

The re-optimization threshold (step 959) determines if the metrics indicate the Wi-Fi network needs to be re-optimized now based on fast changing conditions, i.e., for the fast loop control 920. If so, a reclustering heuristic may be used (step 961) for fast loop optimization (step 962). Periodically, such as once per day (step 963), clustering (step 964) may be performed for the slow loop optimization (step 965). The clustering step balances the benefits of keeping the number of devices to be jointly optimized small, and the disadvantages of optimizing neighboring portions of the network separately, degrading the ability to reach an overall optimum when considering all devices within a physical region.

The long-term optimization could be triggered simply on the basis of time of a time period being reached. For example, it might be triggered once per day, in the middle of the night, when both more compute loads for the optimization are lower, and any disruption in deploying the results of the optimization into the user's network will be less disruptive. The long-term optimization could also be triggered by measurements crossing any type of threshold similar to some of the methods for triggering short term optimizations. However, the long-term optimization thresholds might be different. The short-term optimizations are undesirable to trigger too often, as they run immediately and create potential computing load and disruption repeatedly. However, the long-term optimizations, if constrained to running only occasionally and at convenient times, are much less desirable. Therefore, the triggers that might queue a long-term optimization for later can be tighter, ensuring that the network is driven closer to its true optimum state over a period of time.

The long-term optimization (the slow loop control 930) could be driven by the history and forecasts of: network traffic, capacities between access points 14, capacities between access points 14 and Wi-Fi client devices 16, channel availability, etc. for several hours into the future. The forecasts could include characterizations of peak periods, statistics of client capacities and channel business obtained from historical data spanning weeks to months. The long-term optimization could be carried out across several neighboring homes that are grouped together based on the high levels of impact that activity at a home has on performance at neighboring homes (i.e., clustering). The output of the long-term optimization could be in the form of a single network configuration or a schedule of network configurations that identifies the configuration to use for different segments of time.

The short-term optimization (the fast loop control 920) adapts to fluctuations in the network traffic load and interference conditions on the timescales of tens of seconds to several minutes. The optimization could be triggered by detecting shifts in network conditions or degradation in performance using filtered, aggregated short-term data or when deviations from the long-term forecasts are observed, based on the metrics. The fast loop control 920 is driven by forecasts over short time horizons based on measurements collected in the recent past as well as long-term historical data and the results of the slow loop control 930. The fast loop control 920 could be more localized than the slow loop control 930 and could be carried out to determine the configuration of a single home or a smaller group of homes (reclustering heuristic) in order to reduce computation time and enable near real-time control of the network. However, the fast loop control 920 could take into account the impact of any changes on the larger cluster of homes used in the slow loop control 930.

It is not necessary that the network parameters optimized as part of the fast loop control 920 be identical to the slow loop control 930. The fast loop control 920 could consider a subset of the parameters to make the computation and control more efficient or consider other parameters that are not set by the slow loop control 930. For example, the fast loop control 920 can focus on channel assignments and channel bandwidth as opposed to topology changes. The fast loop control 920 could also take into account the overhead and disruption imposed in changing the network configuration during a busy period. Different configuration changes could be assigned costs that vary based on the control operations, and the optimization could find a new configuration that balances the performance improvement achieved with the cost of transitioning to the new configuration.

FIG. 8 illustrates the cloud based system 1000. In an embodiment, the cloud based system 1000 can include a Software Defined Networking (SDN) controller 1010 with OpenFlow interfaces and Open vSwitch Database Management Protocol (OVSDB) interfaces. The SDN controller 1010 can connect with Application Programming Interfaces (APIs) and services 1020. The unstructured database 1004 can connect to the APIs and services 1020 and to an offline predictive analytics service 1030 which can be configured to implement the slow control loop 930. A real-time filtering and aggregation service 1032 can connect to the APIs and services 1020 and implement the fast control loop 920. The structured database 1002 can receive data from the fast control loop 920 and the offline predictive analytics service 1030 and provide input to a real-time analytics and control service 1034, consumer apps and control interface 1036, and a data exploration and presentation service 1038.

Optimization Process

Again, referring back to FIG. 4, the optimization 70 takes as inputs 60 measurements that are made by each of the access points 14 deployed throughout a location. These measurements could include, but are not limited to, the traffic load required by each client 16, the signal strengths and data rate that can be maintained between each of the access points 14 and from each of the access points 14 to each of the clients 16, the packet error rates in the links between the access points 14 and between the access points 14 and the clients 16, etc. In addition, the access points 14 make measurements of the interference levels affecting the distributed Wi-Fi system 10. This includes interference from other cloud controlled distributed Wi-Fi systems 10 ("in-network interferers"), and interference coming from devices that are not part of the controllable network ("out-of-network interferers"). It is important to make a distinction between these types of interferers. In-network interferers can be controlled by the cloud service, and therefore can be included in a large optimization over all in-network systems. Out of network interferers cannot be controlled from the cloud service, and therefore their interference cannot be moved to another channel or otherwise changed. The distributed Wi-Fi system 10 must adapt around them, rather than changing them. These out-of-network interferers include Wi-Fi networks that are not cloud controlled, and non-Wi-Fi devices that transmit in the frequencies used by Wi-Fi such as Bluetooth devices, baby monitors, cordless phones, etc. A capacity for each link can be derived by examining the amount of data that has been moved (the load), and the amount of time that the medium is busy due to interference. This can also be derived by taking a ratio of the data moved across the link to the fraction of time that the transmitting queue was busy. This capacity represents the hypothetical throughput that could be achieved if the link were loaded to saturation and was moving as much data as it possibly could.

Another important input is the delay of packets traversing the distributed Wi-Fi system 10. These delays could be derived from direct measurements, time stamping packets as they arrive into the distributed Wi-Fi system 10 at the gateway access point 14 (connected to the modem/router 18) and measuring the elapsed time as they depart at the access point 14. However, such measurement would require some degree of time synchronization between the access points 14. Another approach would be to measure the statistics of delay going through each access point 14 individually. The average total delay through the distributed Wi-Fi system 10, and the distribution of the delays given some assumptions could then be calculated based on the delay statistics through each access point 14 individually. Delay can then become a parameter to be minimized in the optimization 70. It is also useful for the optimization 70 to know the time that each access point 14 spends transmitting and receiving. Together with the amount of information transmitted or received, this can be used to determine the average data rate the various links are sustaining.

The outputs 62 of the optimization 70 are the operational parameters for the distributed Wi-Fi system 10. This includes the frequency channels on which each of the access points 14 are operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth) and having a larger number of different non-interfering channels to use in the distributed Wi-Fi system 10. The optimization 70 tries to use the lowest possible channel bandwidth for each link that will support the load required by the various user's applications. By using the narrowest sufficient throughput channels, the maximum number of non-interfering channels are left over for other links within the distributed Wi-Fi system 10.

Another set of outputs 62 of the optimization 70 defines the topology of the distributed Wi-Fi system 10, meaning which access points 14 connect to which other access points 14. The actual route through the distributed Wi-Fi system 10 between two clients or the client and the internet gateway (the modem/router 18) is also an output of the optimization 70. Again, the optimization 70 attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the distributed Wi-Fi system 10. The method of optimizing described later takes all this into account and comes up with the truly optimal arrangement.

The optimization 70 can also decide which links within the distributed Wi-Fi system 10 should use RTS/CTS protocols to prevent problems with hidden nodes and can adjust each access point's 14 transmit power level. Higher transmit power increases the data rate and throughput for links from that access points 14, but creates more interference to other access points 14 in the distributed Wi-Fi system 10 and to neighboring systems. Closely associated to changing the transmit power, the optimization 70 can also set the clear channel assessment threshold at which it either defers to traffic on the airwaves, or goes ahead and transmits on top of other transmissions. This is effectively a way to ignore transmissions from a neighboring network and not delay transmissions when conditions allow us to transmit on top of those other signals.

A large benefit in system performance can be obtained if the optimization 70 is allowed to choose which access points 14 each Wi-Fi client device 16 connects to in the home. This ability helps with several issues. First, Wi-Fi client devices 16 often do a poor job of roaming from an access point 14 they have been connected to, to an access point 14 that they may have moved closer to. These "sticky" clients will experience unnecessarily low throughput as they attempt to communicate with an access point 14 that is too far away. Another advantage to controlling client associations is to avoid congestion at particular access points 14 in the distributed Wi-Fi system 10. For example, all the Wi-Fi client devices 16 in the home might be located closest to one particular access point 14. Their throughput would be limited by the sharing of the total capacity of that one access point 14. In this case, it would work better to force some of the Wi-Fi client devices 16 to associate with different access points 14, even if those access points 14 are somewhat farther away. The capacity at each access point 14 is now shared among fewer Wi-Fi client devices 16, allowing higher throughputs to each. Yet another reason to move Wi-Fi client devices 16 is to relieve congestion in the backhaul links. It is possible that even if the Wi-Fi client devices 16 spread themselves nicely between access points 14, all of those access points 14 may in turn connect to a single access point 14 in the backhaul. In this case the congestion will be in the backhaul. Again, moving the Wi-Fi client devices 16 to other access points 14, that have a different path through the backhaul can relieve the congestion.

Closely related to steering where Wi-Fi client devices 16 associate, is steering which frequency band clients connect on. In many systems and the preferred implementation, the access points 14 can operate simultaneously in more than one frequency band. For example, some access points 14 can operate in the 2.4 GHz and 5 GHz bands simultaneously.

The optimization 70 generates the outputs 62 from the inputs 60 as described herein by maximizing an objective function. There are many different possible objective functions. One objective could be to maximize the total throughput provided to all the Wi-Fi client devices 16. This goal has the disadvantage that the maximum total throughput might be achieved by starving some Wi-Fi client devices 16 completely, in order to improve the performance to Wi-Fi client devices 16 that are already doing well. Another objective could be to enhance as much as possible the performance for the Wi-Fi client devices 16 in the network in the worst situation (maximize the minimum throughput to a Wi-Fi client device 16). This goal helps promote fairness, but might trade a very large amount of total capacity for an incremental improvement at the worst Wi-Fi client device 16.

Figure 9:
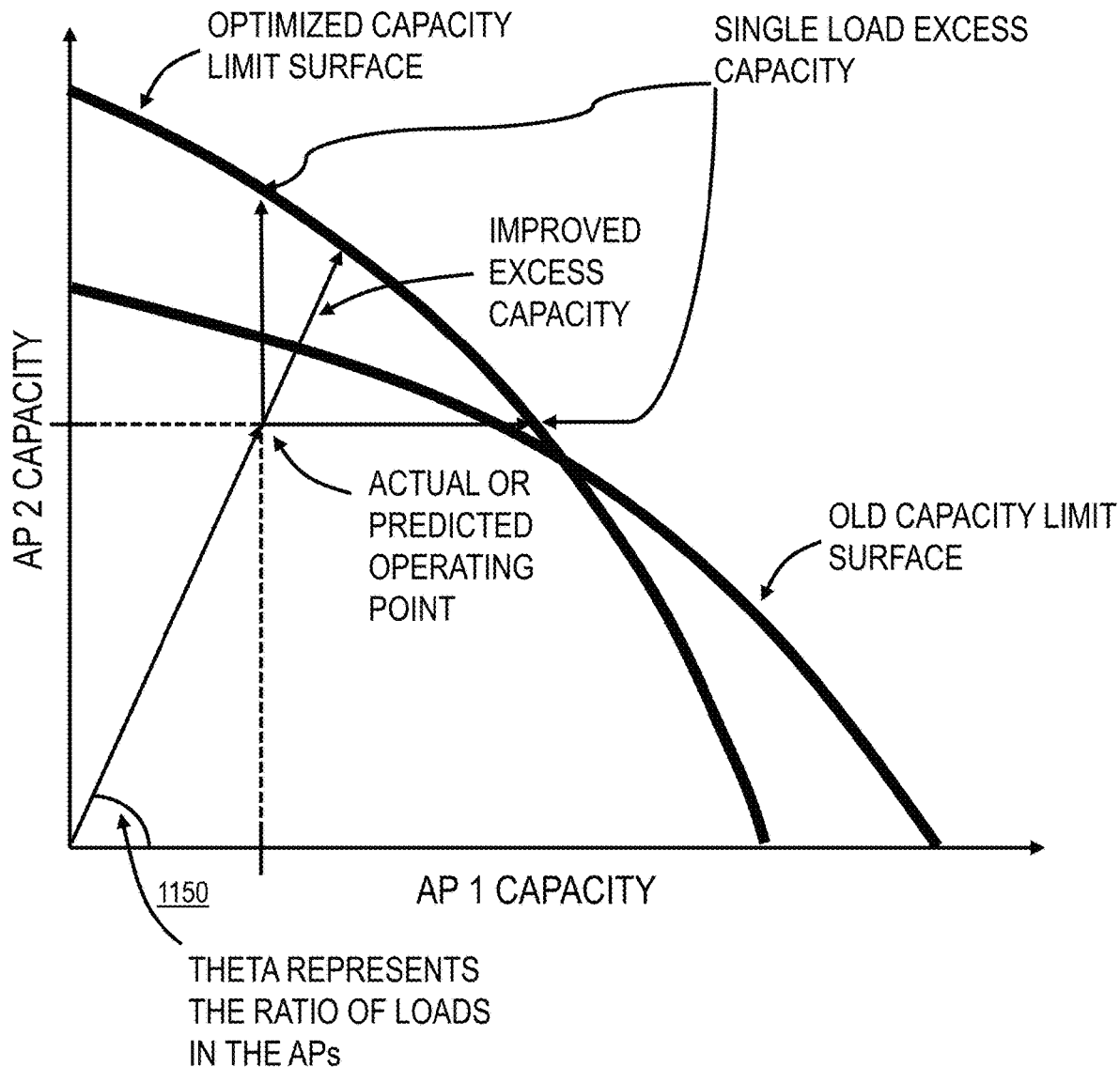
FIG. 9 is a graph of capacity loads of two access points relative to one another.

FIG. 9 is a graph of capacity loads of two access points 14 relative to one another. A preferred method considers the load desired by each Wi-Fi client device 16 in a network and maximizing the excess capacity for that load ratio. FIG. 9 illustrates this approach where the capacity requirements at two different access points 14 is shown. The optimization can improve the capacity, as well as shift the capacity between the two access points 14. The desired optimization 70 is the one that maximizes the excess capacity in the direction of a ratio 1150 of the loads. This represents giving the system the most margin to carry the desired loads, making the performance more robust, lower latency, and lower jitter. This strict optimization can be further enhanced by providing a softer optimization function that weights assigning capacities with a varying scale. A high utility value would be placed on getting the throughput to be equal to or just higher than the required load. Providing throughput to a Wi-Fi client device 16 or access point 14 above the required load would still be considered a benefit, but would be weighted much less heavily than getting all the Wi-Fi client devices 16/access points 14 to the load they are requiring. Such a soft weighted optimization function allows for a more intuitive tradeoff of excess performance between devices.

The aforementioned approach emphasizes optimizing with knowledge of the desired load. The desired load could be communicated directly by the access points 14 if they know it. It also could be estimated over a recent time period (e.g., the last few minutes). The load could also be estimated from long-term historical data. For example, the loads recorded across the last 30 days could be used to determine an expected load, which would then be used in the optimization 70. In this way, the network would be pre-configured for an expected worst case load.

However, there may be times when the load cannot be known. For example, when a new network is just set up, there is neither long-term load history, sort term (e.g., 5 minutes) load requirements, nor would the access points 14 have any knowledge of what loads the Wi-Fi client devices 16 in the environment are requiring. In this case, it is necessary to optimize without load information. A reasonable approach is to optimize under the assumption that the load requirement at each access point 14 is equivalent.

Even if the load is known, it may be beneficial to manipulate the load artificially. For example, recent history, or even long term history, may predict that the load on a particular access point 14 is going to be zero. However, there is still the chance that someone may go into that room and try to get data to a Wi-Fi client device 16 over the distributed Wi-Fi system 10. Therefore, it is beneficial to reserve a minimum load for each Wi-Fi client device 16 or access point 14, to ensure that there is at least some capacity in all locations to handle rare events gracefully.

Other factors can be put into the objective function. For example, certain types of changes to the distributed Wi-Fi system 10 are highly disruptive, interrupting traffic in the distributed Wi-Fi system 10 while the changes are made. A cost could be added to the objective function that would represent the disadvantage of making certain types of changes to the distributed Wi-Fi system 10. By properly weighting this cost versus the other factors, the objective function can be tuned to induce the optimization 70 to change the distributed Wi-Fi system 10 configuration when there is a lot to be gained, but to leave the distributed Wi-Fi system 10 alone when the gains would be only modest. Similarly, a hysteresis threshold could be applied to the optimization 70 output, ensuring that the distributed Wi-Fi system 10 sits relatively stable rather than flipping back and forth between two configurations at the smallest change in circumstances.

Figure 10:
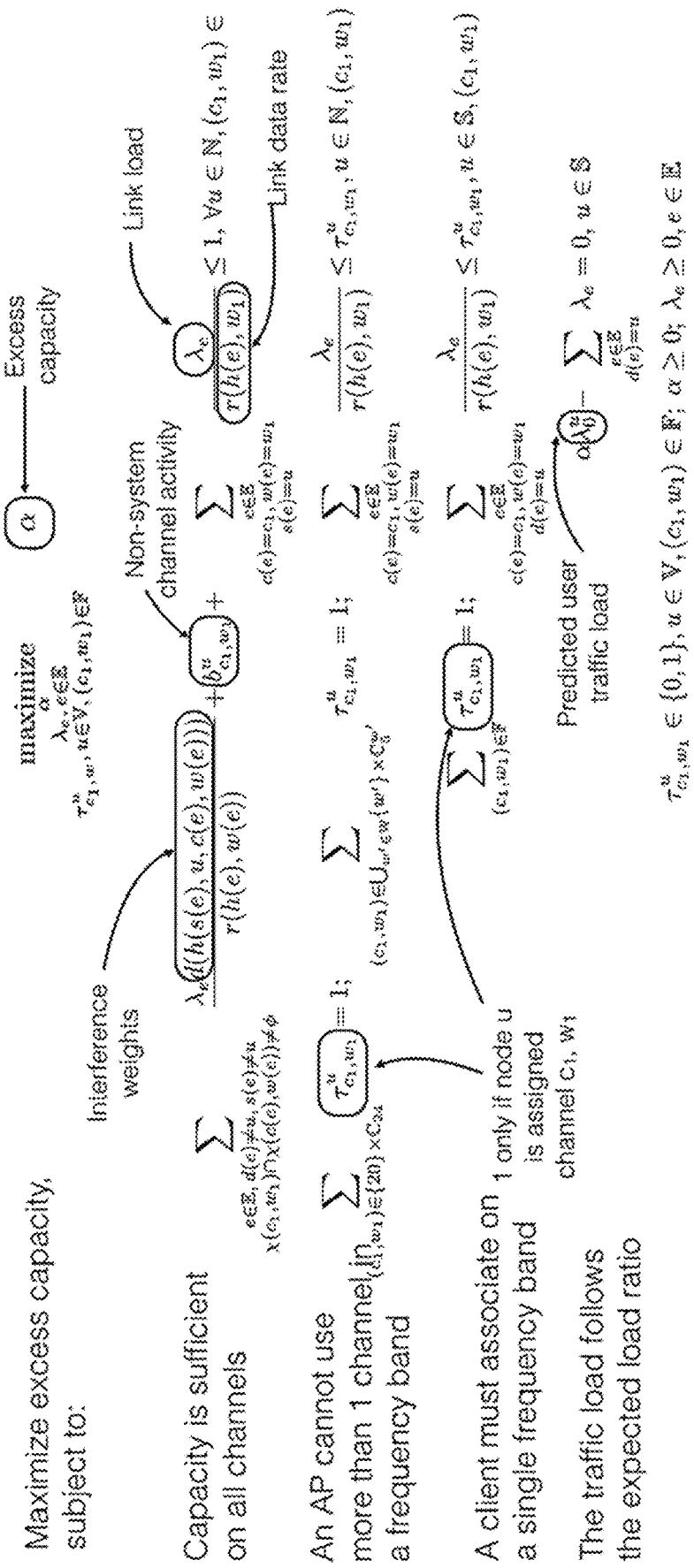
FIG. 10 is a diagram of equations of an example Mixed Integer Linear Program (MILP) for the optimization.

FIG. 10 is equations of an example Mixed Integer Linear Program (MILP) for the optimization 70. With the inputs 60, and objective function known, it becomes a mathematical problem to find the set of outputs 62 that will maximize the objective function. A very efficient way of doing this is to formulate the problem as a Mixed Integer Linear Program (MILP). There are several advantages to this formulation. First, it fits the nature of the problem as there are both continuous and discrete variables involved. For example, channel selection is an integer variable. Second, efficient methods for solving MILP problems are well known. Third, the formulation is fairly generic, accommodating a wide variety of objective functions and constraints on the solution. FIG. 10 shows a mathematical representation of an example MILP formulation, with annotations describing the various elements of the equations.

Ideally, this optimization would be done across not a single home, but all homes that are within Wi-Fi range of each other, and therefore generate interference to each other. Of course, the homes that interfere with the first home have themselves interferers that are even farther away. Proceeding in this way could result in attempting to optimize a very large number of homes all in a single optimization, for example, all homes in Manhattan. The computation time for MILP solutions goes up exponentially with the number of parameters being optimized, so it goes up exponentially with the number of homes across which a single optimization is run. A solution to this is to do clustering.

Figure 11:
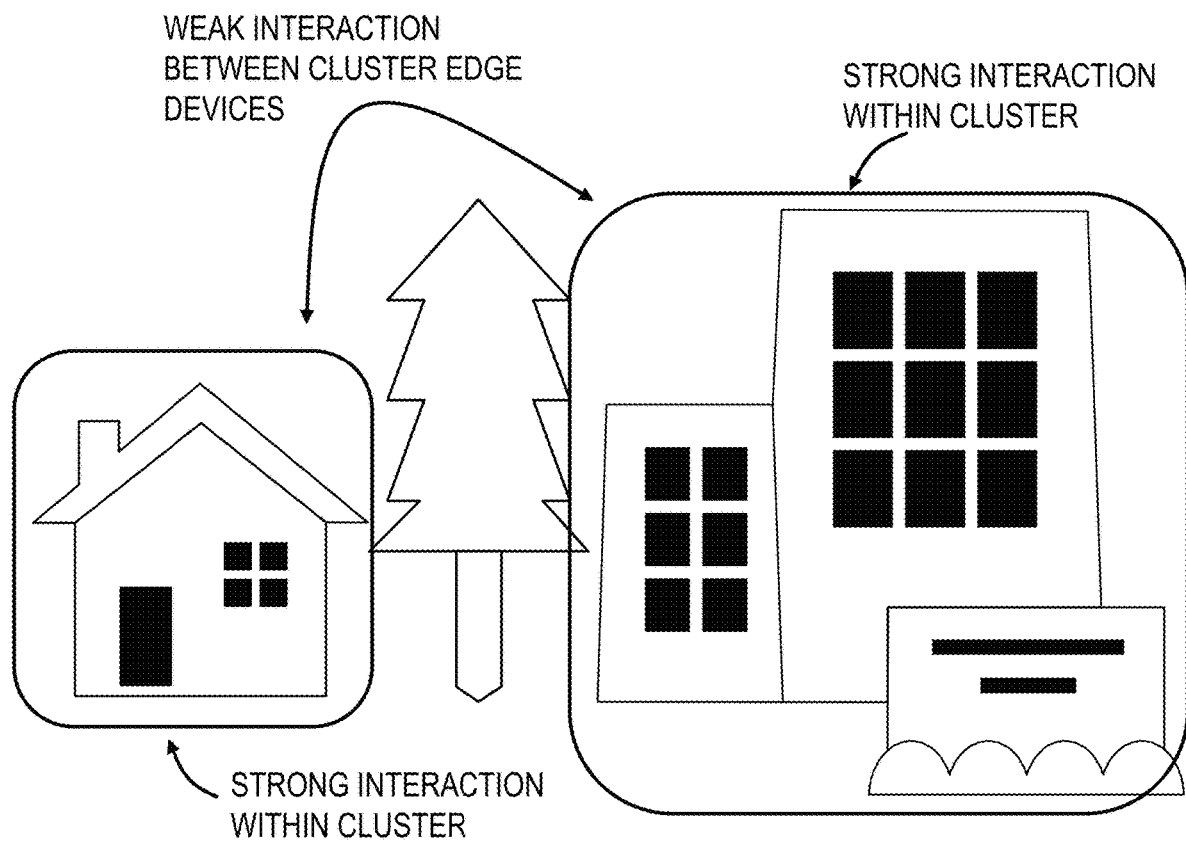
FIG. 11 is a diagram of an example of clustering to reduce the number of homes being jointly optimized, thereby making the computational complexity manageable.

FIG. 11 is a diagram of an example of clustering to reduce the number of homes being jointly optimized, thereby making the computational complexity manageable. If the separate clusters still have a high level of overlap at their boundaries, an iterative approach could be applied. In a first pass, it could be assumed there would be no interference between clusters. In a second pass, the interference from the second cluster to the first cluster could be calculated, and then the best configuration for the first cluster re-calculated with that information. The second cluster could then be re-optimized, accounting for the new interference from the first cluster. Because iterations increase the computation load linearly, while cluster size increases computation exponentially, several iterations would still be far less computational than solving the entire problem jointly.

There can be complexities within the optimization 70. Several optimization parameters will alter the inputs to the optimization 70 itself. For example, changing the band or channel may change the transmit power that the access points 14 put out, thereby changing the interference they present to other access points 14. Similarly, different data rates are often transmitted with different power levels, so as Wi-Fi client device 16 or access point 14 associations are changed, interference effects must be re-calculated as well.

There are also specific Wi-Fi client device 16 behaviors to be considered. For example, some Wi-Fi client devices 16 dynamically switch on a packet-by-packet basis between different bandwidths of transmission (20, 40, 80 MHz, etc.). Other Wi-Fi client devices 16 are much less flexible, and if asked to use 40 MHz channels will only send 40 MHz packets. The first group of Wi-Fi client devices 16 almost always benefit from the allocation of a 40 MHz bandwidth channel, as they will use it when they can, but will also transmit in a lower bandwidth mode if there is interference on a part of the 40 MHz channel. Wi-Fi client devices 16 in the latter category can only benefit from a 40 MHz channel if that channel has very little interference anywhere on it. The difference between Wi-Fi client device 16 behaviors is something that can be learned over time from the network measurements that are being reported to the cloud service.

Figure 12:
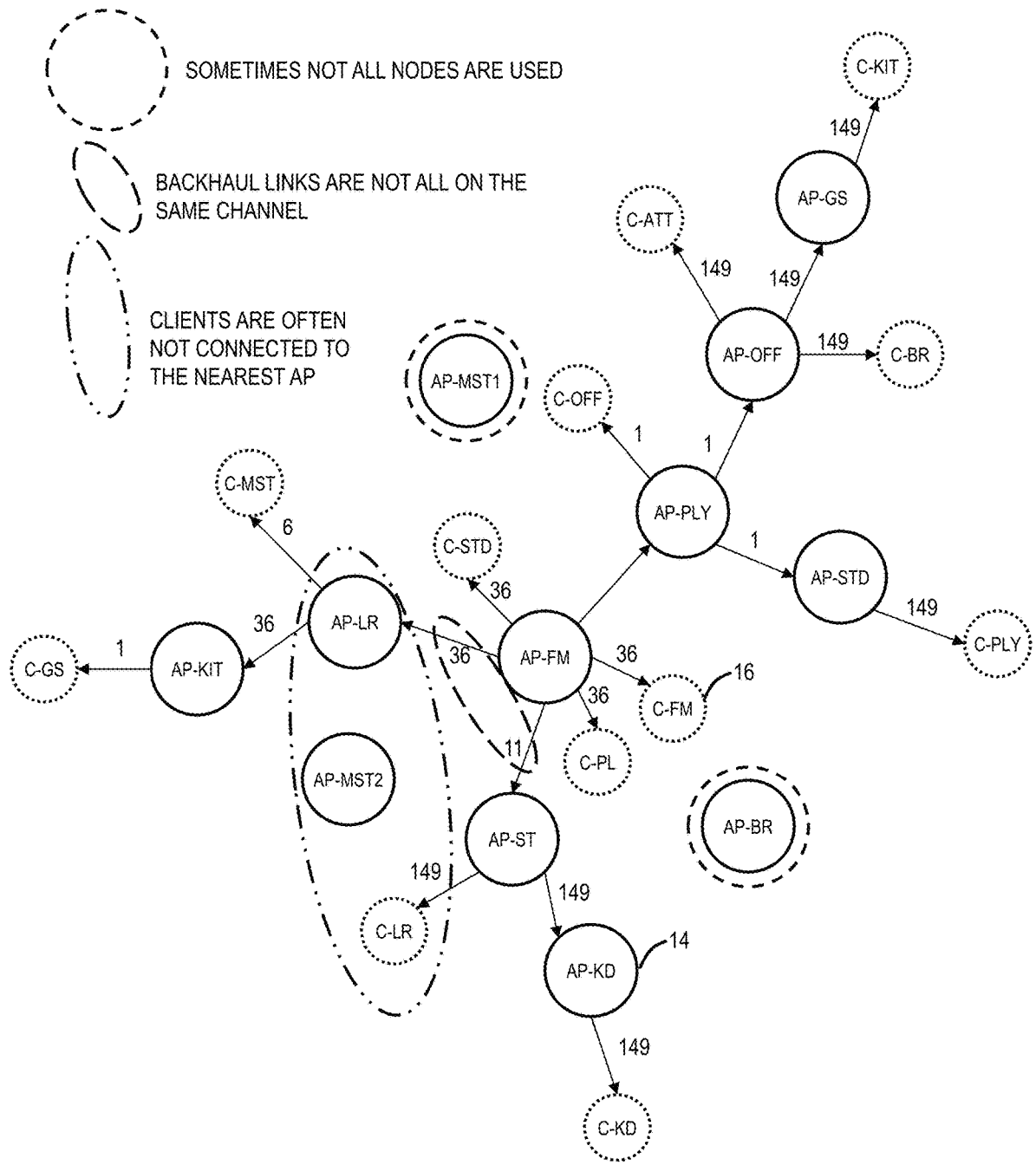
FIG. 12 is a graph of a sample output for the optimization in an example location.

FIG. 12 is a graph of a sample output 62 for the optimization 70 in an example location. The uniqueness of the optimized distributed Wi-Fi system 10 can be seen in some of the properties that appear in the optimization 70 results. FIG. 12 highlights three important aspects of these types of networks that do not occur in prior art Wi-Fi systems using repeaters or mesh networks. First, not all access points 14 are used. In existing systems, if a repeater or mesh node can communicate back to the master node at all, and if any clients associate with it (perhaps because they are closer to that node than any other node), that pathway will be used. However, that pathway may be a very poor pathway. Imagine a consumer placing a repeater in the very far corner of his house from the gateway/master node. This repeater will become the most difficult and lowest data rate device to connect to in the entire home. It will actually be harder to reach than going directly to any of the clients in the home. However, in existing systems, traffic will be routed through that device. In the distributed Wi-Fi system 10, the optimization will naturally take this access point 14 out of the network, not connecting it to any parent nodes, or move all client associations away from that device.

The second important aspect shown in FIG. 12 is that the backhaul links, those links connecting the access points 14 together and carrying traffic from and to the master gateway access point 14 (the one connected to the modem/router 18), are not all on the same frequency channel. This allows multiple transmissions in the backhaul portion of the network to occur simultaneously since transmissions on different frequencies will not interfere. Existing Wi-Fi systems using repeaters or mesh networks use a single frequency channel for the backhaul. Therefore, only one transmission can be going at any time within the entire backhaul system, limiting throughput and capacity.

The third important aspect shown in FIG. 12 is that Wi-Fi client devices 16 are often directed to attach to the access point 14 that is not the closest access point 14 to that Wi-Fi client device 16. This allows load balancing both in the leaf nodes and in the backhaul, as necessary. Current Wi-Fi systems, including systems with repeaters and mesh networks, do not control where the clients associate, and therefore have points of congestion where the performance will be poor.

Figure 13:
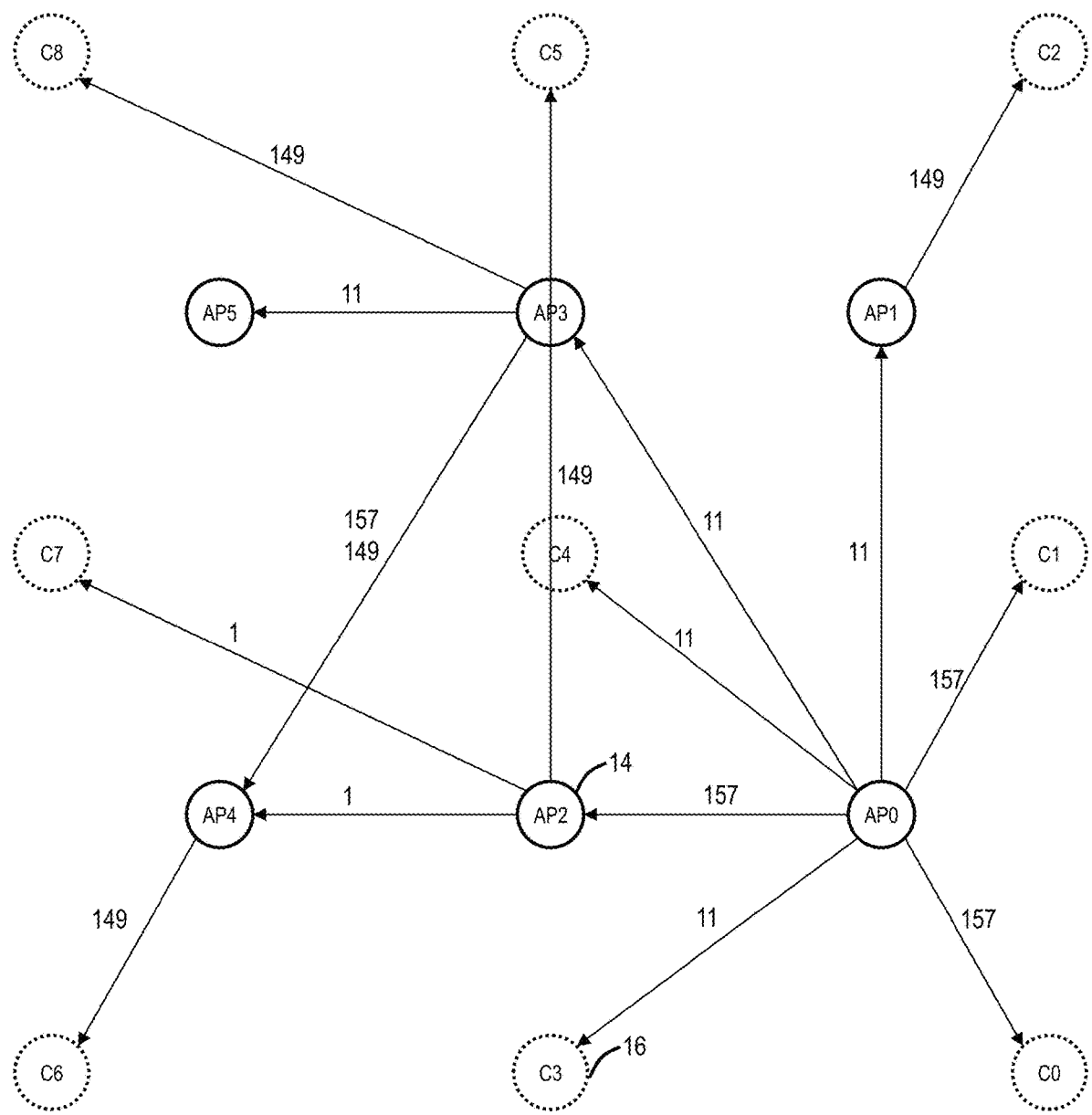
FIG. 13 is a graph of an output of the optimization in a tree structure.

FIG. 13 is a graph of an output of the optimization 70 in a tree structure. The output of the optimization 70 shown above follows a tree structure. Each access point 14 has at most one parent. However, a more fully interconnected graph could be formed. FIG. 13 shows an example of a graph structure. The access point 14 labeled AP3 in this figure has two parent devices, AP4 and AP0. This can be helpful in that more total throughput can be provided to AP3 across the two parallel links from AP4 and AP0 than can be provided if just one of them were connected. In order for this to be effective, a networking protocol must be used that can take advantage of multiple parallel links. An example of such a protocol is Multi-Path Transmission Control Protocol (Multi-Path TCP). This protocol is designed specifically for communicating across multiple paths and serves well the need to aggregate bandwidth across parallel paths.

Optimization Using a Channel Assignment Strategy

Figure 14:
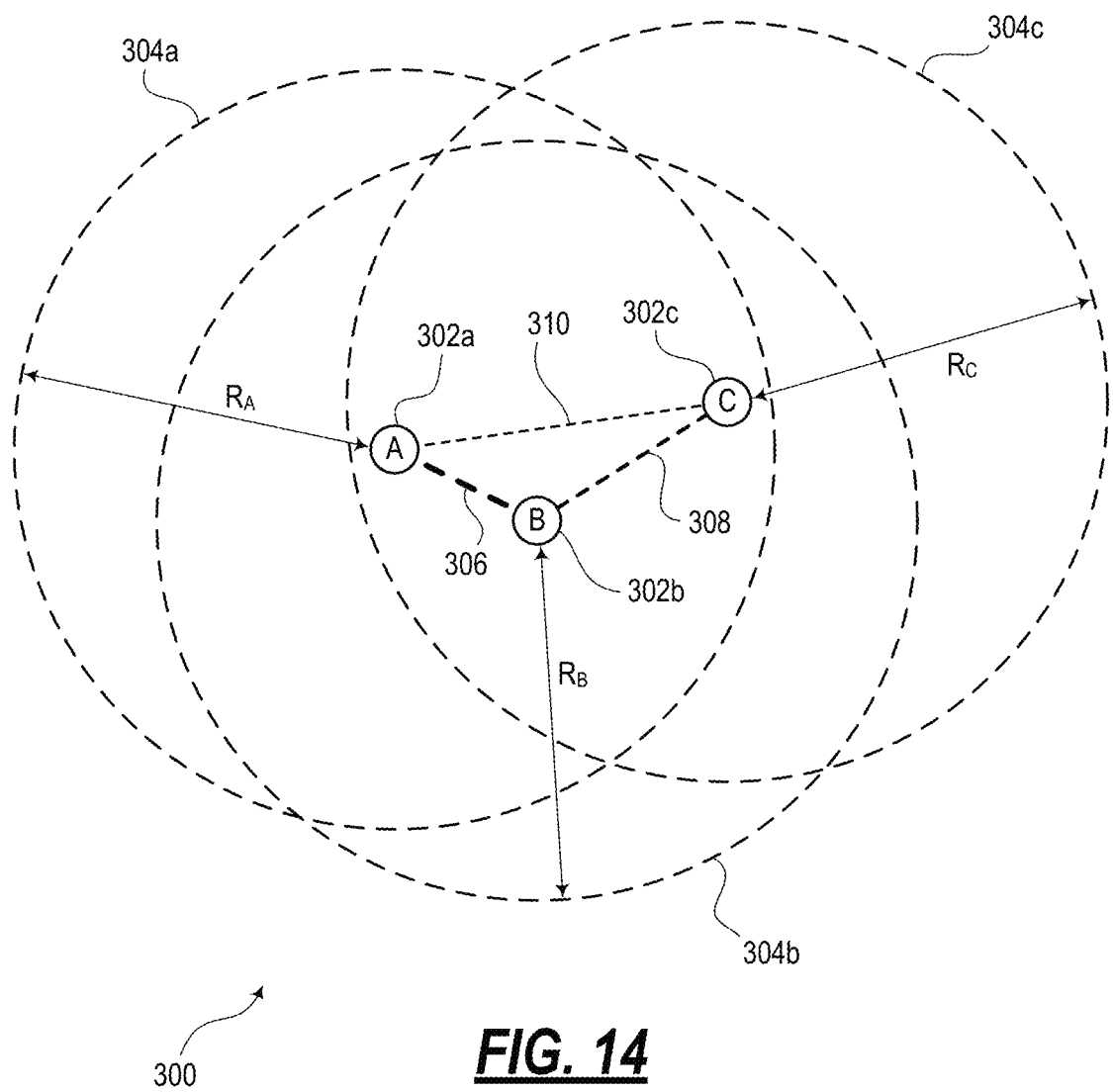
FIG. 14 is a graph showing an example of a plurality of Wi-Fi systems operating in close proximity to each other and the influence of potential signal interference among the Wi-Fi systems.

FIG. 14 is a diagram illustrating an embodiment of a system 300 where multiple Wi-Fi systems are positioned near each other and overlap to some degree. In this example, the system 300 includes three different and independently-operated Wi-Fi networks that may be defined as being centered at nodes 302a, 302b, 302c (i.e., Node A, Node B, and Node C). For example, the nodes 302a, 302b, 302c may each include a gateway device and one or more AP devices. Furthermore, end users (e.g., within a residence) may employ one or more user devices for accessing the Internet via the gateway device and one or more AP devices. The equipment (e.g., AP device) associated with each node 302 may also include one or more transceivers configured to create a widespread area within which the user devices can access the network. For example, as illustrated in FIG. 14, node 302a of a first Wi-Fi network may include a first range 304a (e.g., having radius RA), node 302b of a second Wi-Fi network may include a second range 304b (e.g., having radius RB), and node 302c of a third Wi-Fi network may include a third range 304c (e.g., having radius Rc). Although the ranges 304a, 304b, 304c are shown as being circular and having about the same size, it should be noted that each actual range may be a factor of the properties of the transceivers as well as external influences, such as walls, floors, ceilings, roofs, etc. of a home where the transceivers may be located. Therefore, the ranges may variable. The Wi-Fi networks are illustrated with the nodes 302a, 302b, 302c being separated by distances 306, 308, 310.

It should be noted that the ranges 304a, 304b, 304c shown in FIG. 14 in this example overlap to some degree. Therefore, some equipment near each of node 302a, 302b, 302c may be affected by the wireless signals propagated throughout the other Wi-Fi networks. It should also be noted that when a user attempts to access the Internet via a Wi-Fi network, the user may typically be able to see a plurality of other Wi-Fi networks from other houses in the vicinity. Because of these overlapping Wi-Fi networks, the systems and methods of the present disclosure are configured to perform certain optimization techniques to minimize (or reduce) the effect of interference due to the operation of other nearby Wi-Fi networks, particularly those using the same frequency channel.

According to various implementations, the optimization techniques may be performed by the cloud-based server 20, 200, SDN controller 1010, and/or other suitable controller that can obtain metrics from the distributed Wi-Fi system 10 or other group of Wi-Fi networks. The controller (e.g., server 20) may be configured to optimize operation for an entire system, which may include over a million Wi-Fi networks, or for a smaller subset or cluster of Wi-Fi networks. Based on some strategies described herein, some large clusters may be broken down into smaller, more manageable clusters. In some embodiments, the size of the cluster may be controlled to include at least a minimum number of Wi-Fi networks (e.g., ten) and less than a maximum number of Wi-Fi networks (e.g., 50).

As opposed to a cloud-based control, some implementations may include logic programs or applications installed on each of a plurality of participating AP devices for optimizing in a cluster within an area. In some embodiments, the optimization techniques described herein may be combined with the optimization 70 of FIG. 4 and optimization method 900 of FIG. 7. A controller (or each participating node or AP device itself) may include non-transitory computer-readable medium for storing programs or instructions for executing optimizations methods (e.g., via one or more processing devices).

For example, in one implementations, a non-transitory computer-readable storage medium (e.g., of a controller, such as the cloud-based server 20, SDN controller 1010, etc.) may store computer-readable instructions or logic code. The instructions or code may be configured to enable or program one or more processing devices to perform certain optimization steps of an optimization method, as described herein. The optimization method may include the step of detecting a cluster of Wi-Fi networks operating independently of each other. In this sense, a "cluster" may be defined in that each Wi-Fi network includes a wireless transceiver configured to receive at least a minimum amount of signal power from one or more other wireless transceivers of one or more other Wi-Fi networks. The optimization method may also include the step of determining which Wi-Fi networks of the cluster are enabled for cooperative optimization. For example, "cooperative optimization" may refer to the coordinated control of a number of controllable devices to optimize a cluster. These controllable devices may be provided by the same vendor, for example, or may be configured to meet certain standards or protocols (e.g., existing and/or new protocols) for optimizing an entire cluster, instead of simply optimizing for a node itself (i.e., greedy optimization). Next, the optimization method may include the step of assigning a Wi-Fi channel to each of the wireless transceivers of the Wi-Fi networks enabled for cooperative optimization to reduce interference based on at least the received signal power for the one or more other wireless transceivers.

Again, the computer-readable medium may be associated with a cloud-based server, SDN controller, or other controller for controlling a number of wirelessly connected nodes in one or more clusters. The plurality of Wi-Fi networks may operate independently of each other, but may also be located near enough to each other where there is a measurable amount of interference between the Wi-Fi networks. Thus, control may be used to optimize each cluster, where optimization can be related to minimized interference or congestion. This may be a factor of interference on various frequency channels available within certain available Wi-Fi frequency bands (e.g., 2.4 GHz, 5 GHz, etc.). Also, this may be a factor of different times of the day when channels are used throughout a cluster, the signal strength of neighboring nodes, the distance between nodes, etc.

Thus, the coordinated optimization may involve independent networks (e.g., Wi-Fi networks used by multiple households within a neighborhood). If these households or residences are utilizing the same type of Wi-Fi equipment that is equipped with the optimization functionality described herein, then the control functions can be executed to coordinate channel selection within the cluster to reduce interference. The various nodes or Wi-Fi networks can therefore be jointly organized and optimized to benefit the global system or cluster as a whole. Although the term "optimization" is used throughout the specification, it should be noted that optimization techniques may merely involve processes that work toward an ultimate optimization (if one exists or can be perceived) or one that merely improves upon typical operating systems and methods or one that merely reduces the negative effects of interference or congestion from neighboring networks on channels or transmissions within the Wi-Fi networks.

In some respects, the optimization methods (or interference reduction methods) may include detecting, on each of a plurality of wireless communication channels, the "interference" from one or more other wireless sub-systems. It may be noted that interference may be based on the frequency channel of a neighboring Wi-Fi network as well as the signal strength received from a neighbor (e.g., Received Signal Strength Indicator (RSSI), a power level (in dBm), etc.), which may essentially be a factor of the distance between two neighboring nodes. A node may detect the identity of each of the other wireless sub-systems within range of detection and communicate this information to the cloud-based server or central controller. Also, the systems can detect traffic load, signal strength, operating channels, and time of use with respect to the wireless signals transmitted from each the other. It may be noted that different Wi-Fi channels may have some level of overlap and can therefore have a negative impact on nearby systems using the same channel or even a channel that is close to the same channel. As described above, the detected metrics at each Wi-Fi network can be communicated to the cloud-based server (e.g., step 53 of FIG. 3).

Regarding the aspect of combining a number of Wi-Fi networks into a cluster (or into a plurality of clusters), the interaction of interfering channels can be considered in the optimization techniques. The cloud-based server 20 may initially compute a very large cluster of all the Wi-Fi networks that are "connected" by "edges." In other words, the edges may represent unplanned interaction between nearby Wi-Fi networks, each of which may experience some level of interference or "pain." For example, if one Wi-Fi device in one network experiences wireless signals having a signal strength of greater than a certain threshold (e.g., 10 dBm), then that Wi-Fi device may suffer from the interference of these signals. Likewise, wireless signals from the second device may also cause "pain" on the first Wi-Fi device, which may also have about the same level of signal strength.

The cloud-based server may analyze identifying information of the relevant Wi-Fi networks to determine which Wi-Fi networks are "in-network," which may refer similarly enable devices that can participate in the group optimization efforts described herein. The participating or in-network device are therefore controllable, as described herein, while out-of-network devices (e.g., from different vendors) might not be able to participate in the join optimization and may not be controllable.

After the cluster (e.g., large cluster) is mapped, the cloud-based server may then determine if the size of the cluster is problematic. For example, with too many Wi-Fi networks in a cluster, it may be difficult to reasonably optimize the entire cluster and eliminate a large amount of interference from shared channels. If a cluster is too big (i.e., too many Wi-Fi networks in the cluster) or if the number of Wi-Fi networks in the cluster is greater than a certain threshold (e.g., 500), then the systems and methods may figure out how to divide the cluster into a plurality of smaller clusters, sub-clusters, and so on, as needed to reach a reasonable size. After this, the optimization processes can proceed for each individual cluster, sub-cluster, etc.

A large cluster can be divided up based on adjusting a threshold of the signal strength that defines a "potential" interference. For example, if too many Wi-Fi networks are included in a cluster when the interference threshold is at one small level (e.g., 10 dBm), then it may be possible to cut some of the edges if the signal strength is relatively weak, such as less than a second threshold (e.g., 15 dBm). Also, a large cluster can be divided up based on the fewest number of cuts needed to separate into two somewhat equal clusters. For example, this may be applicable to a situation where an apartment complex may have separate buildings near each other and there is a greater interaction among Wi-Fi network within the same building, but not as great from one building to the next. Also, a large cluster might be divided up based on building division identification, mailing address information, manually entered information (e.g., addresses), etc.

When clusters are formed such that each cluster is a reasonable size, then optimization may be performed for each cluster, which may be considered to be a first layer optimization or cluster-based optimization. The cloud-based server can assign a specific frequency band and channel for each Wi-Fi network (or node) so as to "minimize" interference through the group of participating nodes. For example, the bands may be selected from 2.4 GHz and 5 GHz, where the 2.4 GHz band may include channels that can be selected among those available. In one embodiment, the available 2.4 GHz channels may be limited to selection from among channels 1, 6, and 11. Also, in the 5 GHz band, the channels and/or bandwidth (e.g., 20 MHz, 40 MHz, 80 MHz, 160 MHz) may be selected.

The optimization may be based on various factors, such as signal strength information from neighboring systems. In some cases, only certain signal strength levels may be considered as being relevant to potential interference (e.g., having an RSSI of greater than 10 dBm). In some embodiments, an initial training may be performed based on currently available information of a system. Thus, as more information is received, it may be advantageous to re-optimize using traffic load patterns, time of use patterns, a pain metric, a range of interference, etc. For example, the pain metric may be related to a product of traffic load and an amount of interference. Also, the systems and methods may also include the step of re-optimizing based on information about interference or congestion caused by non-participating Wi-Fi networks, such as those that use the same channels or overlapping channels.

According to some embodiments, optimization may primarily be related to the action of strategically assigning channels for different Wi-Fi networks in a cluster. In one case, channel assigning may include the use of a graph-coloring technique, which may be similar to the techniques or algorithms used for coloring different territories on a map so that no two bordering territories contain the same color. In the present disclosure, each color in this example may represent a unique frequency channel. In some cases, it may be possible to use three colors (channels) in a "map" to separate the interfering channels as much as possible, thereby providing the opportunity to achieve an improved or optimized channel utilization or assignment.

Thus, by optimizing, it is possible to minimize the average interference (or pain) across the cluster and/or minimize the maximum interference (or pain) in the cluster. For nodes having a plurality of access points in the Wi-Fi network, further optimization may be performed for each of the access points. It may be noted that the optimization processes described herein may be independent of any service providers that might be used throughout a cluster, as long as the participating nodes can be work together to achieve a reduction in signal interference by strategically assigning channels so that there is less or minimal overlap.

Figure 15:
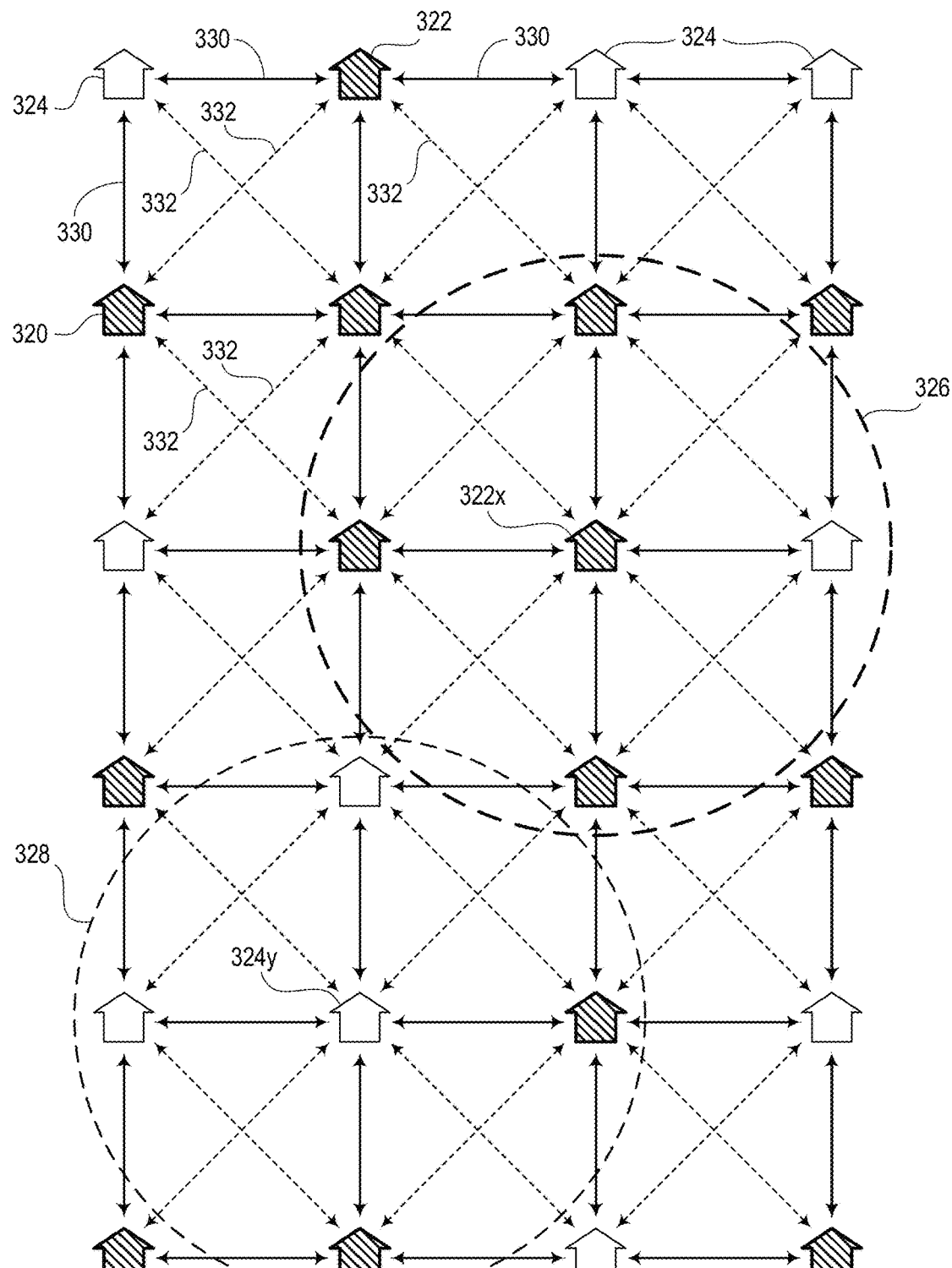
FIG. 15 is a graph showing an example of a plurality of homes arranged in a grid where each home has a Wi-Fi system that creates potential signal interference among other Wi-Fi systems.

FIG. 15 is a diagram illustrating an embodiment of a cluster 320, whereby, for illustrative purposes, multiple homes are arranged in a grid. Each home has a Wi-Fi network that creates potential signal interference among other Wi-Fi networks. In this example, some homes 322 are configured as homes that are considered to be "in-network." That is, these in-network homes 322 have Wi-Fi networks with the same or compatible equipment that can be coordinated in a way to optimize the cluster 320. For example, the in-network homes 322 may be configured to be controllable by the cloud-based server 20 to perform the optimization techniques described herein. On the other hand, some homes 324 are considered to be "out-of-network." That is, they may be provided by other vendors and might not share the same optimization capabilities for working with other Wi-Fi networks to optimize the entire cluster 320.

The cluster 320 shows one particular in-network home 322x having a range 326 where signals from the home 322x are likely to be present in neighboring homes, some of which may be other in-network homes 322 and some of which may be out-of-network homes 324. The pairs of homes 322, 324 that are nearest to each other are "connected" by an edge 330, which represents the unintended interference effects of closely positioned, yet independently operated, Wi-Fi networks. Also shown in FIG. 15 are edges 332, which represent the node pairs on the diagonals, which are not nearly as influential as the nearest edges 330, but still may include some concerns with respect to interference. However, for the sake of illustration, the range 326 is shown to demonstrate that the closest edges 330 may experience greater signal strength between the two homes 322, 324. Also, a second range 328 is shown, which represents a similar area or region of influence as the range 326, but may however be associated with an out-of-network home 324y.

It may be noted that the embodiments of the present disclosure may be functional when at least a certain level of penetration in a cluster is reached. For example, if at least two in-network homes 322 are within range of each other, they may be assigned channels to minimize interference with each other and may also be optimized to minimize interference from the out-of-network homes 324.

FIG. 16 illustrates the cluster 320 of FIG. 15 where the in-network homes 322 have been assigned channels selected from three available channels in the 2.4 GHz band (e.g., channels 1, 6, 11). Homes 340 are assigned channel 1, homes 342 are assigned channel 6, and homes 344 are assigned channel 11. Assuming that the signal strengths and interference effects are consistent throughout the cluster 320 and that the home are spaced at equal distances in the grid, it can be seen that the channel assignment includes a particular pattern where no two adjacent homes on the nearest edges 330 have the same channel. However, because of the low number of available channels in this example, home adjacent along the diagonal edges 332 may sometimes have the same channel. Thus, the different channels can be assigned to reduce potential signal interference throughout the cluster 320.

The example of FIGS. 15 and 16 shows a situation where each home or residence is equally spaced and include similar signal ranges. However, it may be noted that in the real world, homes will normally not be arranged quite so predictably, and the effective ranges may be affected by the power parameters of the Wi-Fi equipment, the structure (e.g., walls, ceilings, etc.) of the homes, etc. Potential solutions to the problem of channel interference may include simple heuristics, which may be based on centralized frequency planning. The local channel selection of conventional systems may be based on "greedy" algorithms, where each home attempts to optimize on its own with the cooperation of nearby homes. However, the optimization systems and methods of the present disclosure may be performed within related groups of clusters. This optimization of nearby or neighboring Wi-Fi network may particularly be advantageous in a Multi-Dwelling Unit (MDU), such as a high-rise apartment. For example, many MDUs may have many families, each having their own Wi-Fi network provided by one or more service providers, living in close proximity to each other such that the AP devices or other Wi-Fi equipment of one Wi-Fi network may be "visible" to many other residences (or homes). Not only do the systems and methods of the present disclosure determine potential interference based on the range of signal interactions, but they may also be configured to factor in the data load (traffic) of the Wi-Fi networks at each residence and the time of use of each Wi-Fi networks. Thus, additional optimization strategies may be used account for how much traffic is present and when the Wi-Fi networks are utilized.

Again, based on the various factors, the optimization may include "graph-coloring" techniques to assign channels. The factors may include signal strength between nodes, loads, times of use, and/or other metrics. The case of FIG. 16 may assume that the diagonal edges 332 may create sufficient "distance" so that homes on the diagonals do not interfere, but consideration may be given if necessary. In some cases, if the interference range is significant and the channels are few, some strategies may not be much better than random assignment.

In some embodiments, a rigorous MDU optimization may be used. Channel assignments may consider a) range of interference, b) load in neighbors (e.g., apartments, homes, etc.) in question, c) time of alignment of loads, and/or d) an overall "pain" metric (described in more detail below) caused by the interference. The rigorous optimization algorithm may be configured to minimize pain. In some embodiments, the systems and methods may include auto discovery of clusters for joint optimization.

The rigorous MDU optimization may significantly outperform localized or heuristic approaches. For example, there are more degrees of freedom to "color" the graph. Also, an objective function may represent the real goal of the present disclosure. Richer input data may equal more accurate result. Also, Dynamic Frequency Selection (DFS) channels can be allocated based on client capabilities. For example, DFS operational information and radar history can be used as part of the 5 G channel selection.

Figure 17:
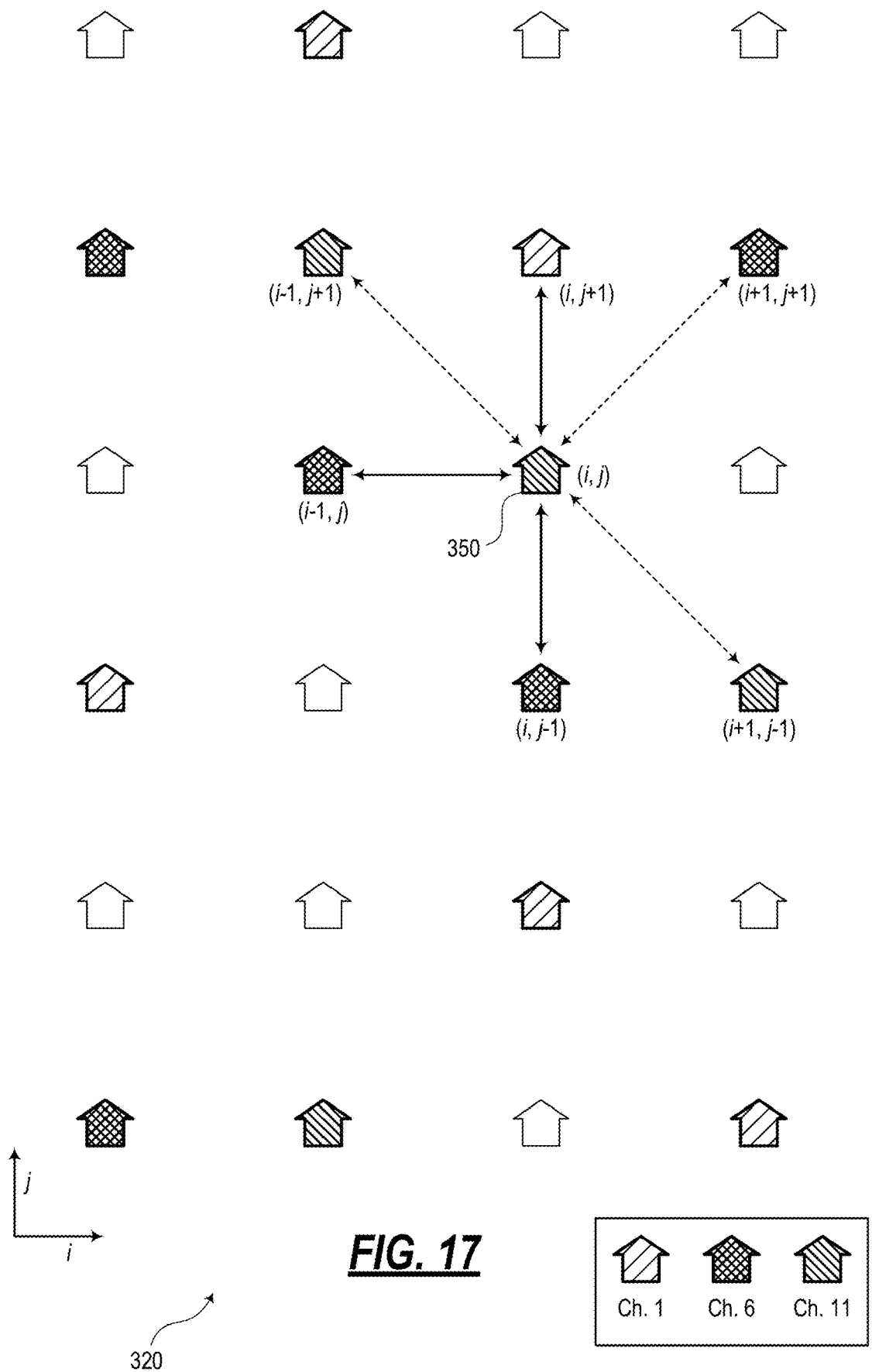
FIG. 17 is a graph showing the homes arranges in a grid as in FIG. 15, where a single home is considered with respect to potential signal interference from other in-network Wi-Fi systems.

FIG. 17 is a graph showing the homes 322, 324 arranges in the grid of the cluster 320 as in FIG. 15. In this example, a single home 350 is considered with respect to potential signal interference from other homes having Wi-Fi systems. The single home 350 is an in-network home having channel 6.

An MDU optimization formulation in this example may estimate the load on each node (or home). Note that the estimated load on a node is independent of the channel. Next, the optimization includes estimating interference from out-of-network neighbors, which may be defined by $$q_{k,c} = l_{k,c} - \Sigma l_{neigh}$$

where q is the estimate of the interference of a node, l is the total interference at the node's location, k identifies the node, c is the channel, and l is the load summed for each in-network neighbor.

For example, for the single home 350, this node is identified as k=i,j, operating in channel 11, such that:

$$q_{(i,j),1} = l_{(i,j),1} - l_{(i,j+1)}$$

$$q_{(i,j),6} = l_{(i,j),6} - l_{i-1,j} - l_{(i,j-1)} - l_{(i+1,j+1)}$$

$$q_{(i,j),11} = l_{(i,j),11} - l_{i-1,j,j+1)} - l_{(i+1,j-1)}$$

In one embodiment, a constraint may include that only one channel can be assigned per node or home. Also, an estimated interference on a node may be related to a) the interference from out-of-network neighbors in the same channel, and b) loads on the in-network neighbors in the same channel, as describe in the following:

$$l_{k,c} = q_{k,c} + \Sigma l_{neigh} * n_{k,c}$$

where l is the interference, q is the interference calculated above summed from out-of-network neighbors, and l is the load.

In one embodiments, the systems and methods may minimize pain across a network, such as using the following equation:

$$\min \Sigma_{k,c} * i_k * n_{k,c}$$

where l is the interference experience by node k in channel c, l is the load, and where the load may be defined by:

$$l_k = \sigma(f_k)$$

where:

$$f_{k=busy}Tx \text{ Min}/(busyTx \text{ Min} + idleTx \text{ Min}), \text{ or}$$

$$f_k = avgTx$$

FIG. 18 is a graph showing a cluster 360 (or system) of ten nodes (e.g., Nodes A-J) in an original arrangement within the cluster 360. Each node experiences potential signal interference from each of the other nodes based on loads. Three different channels (e.g., Ch. 1, 6, 11 of the 2.4 GHz band) are used for Wi-Fi operation in this example. FIG. 19 is a table showing an example of results of the operation of the cluster of FIG. 18.

FIG. 20 is a table showing an estimate of external interferences with respect to the three channels Ch. 1, 6, 11 in the example of FIG. 18. In response, an optimized system or cluster arrangement can be created from the nodes of FIG. 18. For example, FIG. 21 is a graph showing a rearranged cluster 364 showing the same nodes and interference edges as shown in FIG. 18. In this example, the channels are re-assigned according to one optimization process based on the estimates from the table of FIG. 20.

Figure 22:
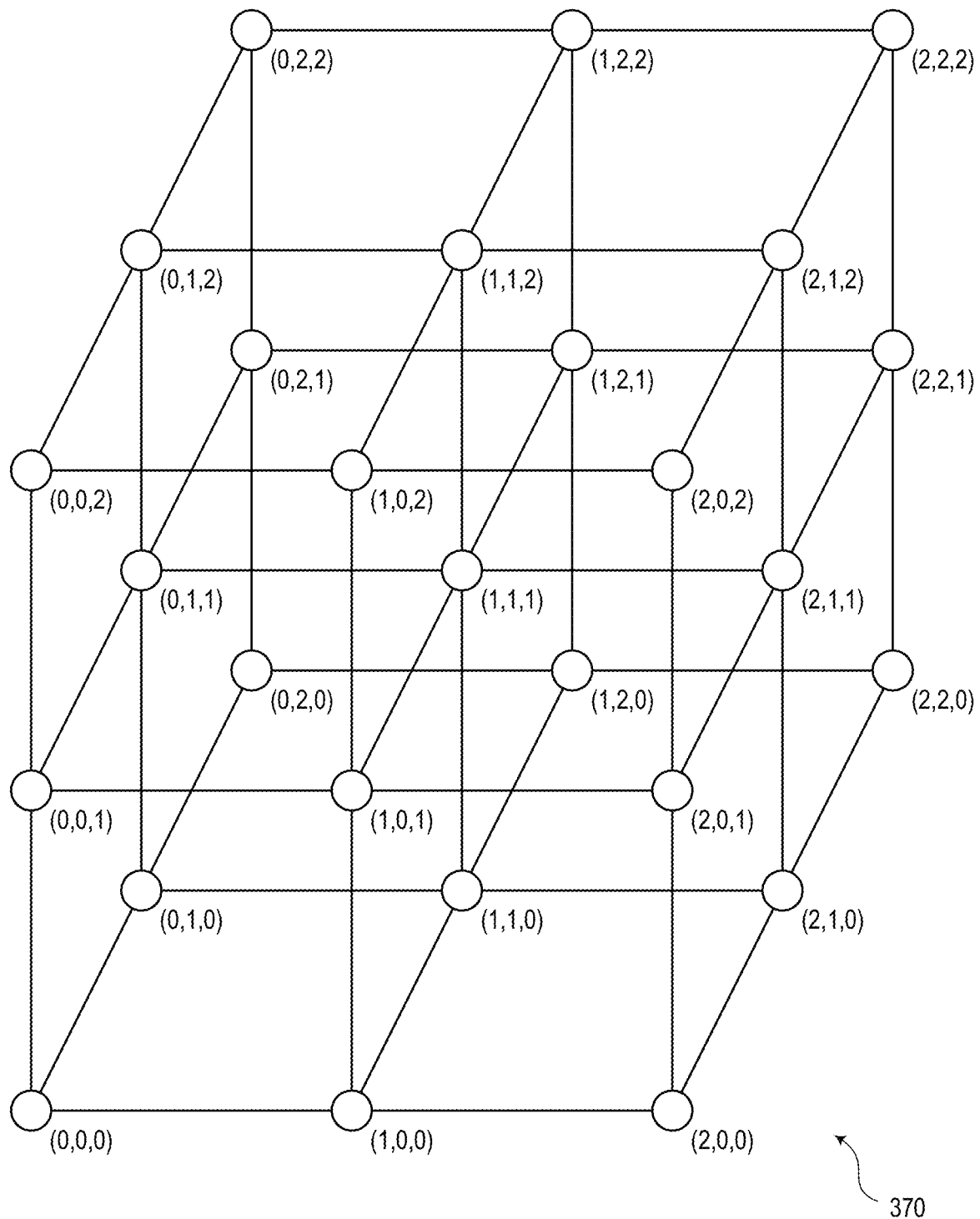
FIG. 22 is a graph showing a three-dimensional arrangement of nodes and the corresponding shortest edges between the nodes.

FIG. 22 is a graph showing a three-dimensional arrangement 370 of nodes and the corresponding shortest edges between the nodes. The slightly longer (diagonal) edges are not shown in this example. Again, the nodes may represent Wi-Fi systems, access points, or other Wi-Fi equipment arranged in separately or independently operated Wi-Fi networks. The arrangement shows a grid having x, y, z coordinates to show how homes or residences may be oriented in certain environments, such as an apartment or other MDU and where interactions and interferences may be relevant. It may be noted that different nodes in the arrangement 370 have different numbers of edges based on their location within the 3D cluster. That is, some nodes may have three edges, while another centrally located node (e.g., node 1,1,1) may have up to six edges. Of course, based on real-world residences and the locations of Wi-Fi equipment, the arrangement of nodes is typically not so uniform.

Figure 23A:
FIGS. 23A and 23B are pictures of Multi-Dwelling Unit (MDU) buildings where multiple Wi-Fi systems may be operated within a relatively small space.
Figure 23B:
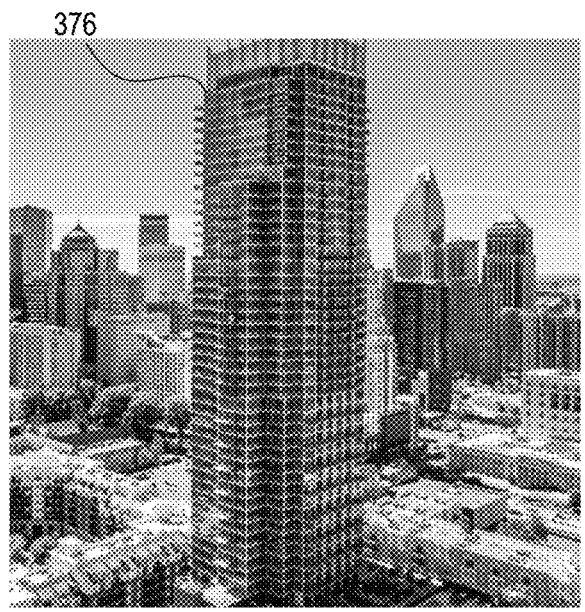

FIGS. 23A and 23B are pictures of Multi-Dwelling Unit (MDU) buildings where multiple Wi-Fi systems may be operated within a relatively small space. For example, FIG. 23A shows a first MDU building 374a, a second MDU building 374b, and a third MDU building 374c, which may be located among other nearby MDU buildings. In may be noted that the interference within each building 374a, 374b, 374c would likely be more significant than the interference from one unit in one building (e.g., building 374a) with a unit in another building (e.g., building 374b). In FIG. 23B, a high-rise MDU 376 may include a large number of units in a relatively small space and where the interferences may be fairly uniform, as in the example of FIG. 22. It may be noted that the cluster size in the high-rise MDU 376 may be very large, since units on one floor would like experience interference from other unit on that floor as well as interference from unit on the floor above or below that unit. Therefore, in some cases, the arrangements may have three-dimensional interactions and interferences from other neighbors, such as is shown in FIG. 22.

Figure 24:
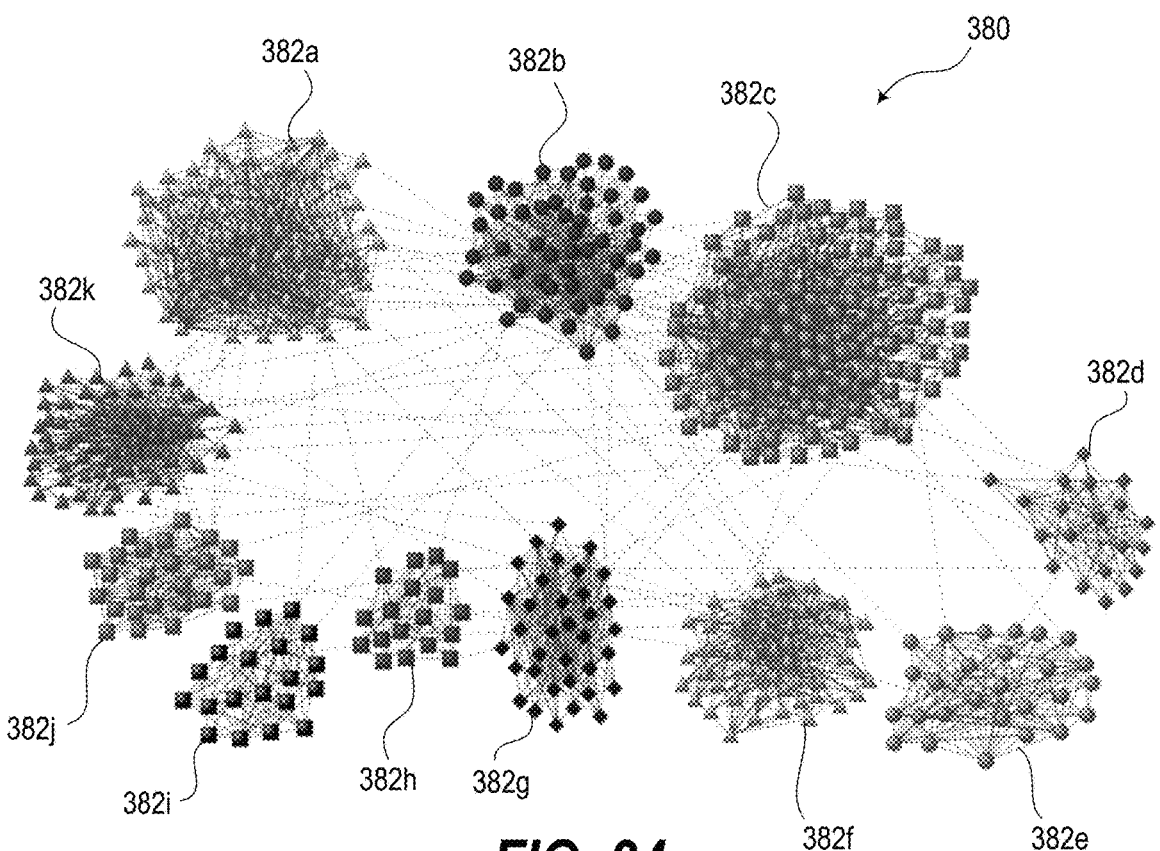
FIG. 24 is a graph showing an example of a number of clusters formed from an MDU.

FIG. 24 is a diagram showing an example of a system 380 having a number of clusters 382a-382k, which may be formed, for example, from an MDU, such as the buildings 374 of FIG. 23A or the high-rise MDU 376 of FIG. 23B. Each cluster 382 includes a plurality of nodes, homes, residences, Wi-Fi networks, etc. Some clusters (e.g., cluster 382h) may include a relatively smaller number of nodes (e.g., 17), while other clusters (e.g., cluster 382c) may include a relatively larger number of nodes (e.g., 80). It may be noted that the system 380 may be originally identified as a single cluster, where there is some interference (edge) between each node and at least one other node. Since the single cluster may be too large and unruly to easily process, it may be beneficial to break the large cluster into a plurality of clusters, as is shown in FIG. 24. Still, there will be some interactions between some nodes in one cluster with some nodes in other clusters, but it should be understood that the clusters can be created whereby these inter-nodal interactions are less significant than the interactions within the clusters themselves and can therefore be ignored (at least initially). Therefore, optimization processes as described in the present disclosure can be performed per cluster. Again, optimization may include the assignment of channels (e.g., Ch. 1, 6, 11) of a band (e.g., 2.4 GHz band) or bands.

The systems and methods of the present disclosure may be implemented in a number of different ways. The embodiments may obtain data from different sources, where the data may include node dimensions. The processes may include building a master list of gateways in homes across a cluster or deployment. The systems and methods may use NeighborByPod daily statistics, where each in-network AP can scan for neighbors that are within range and can detect information from this scan. The AP can also perform a scan for not only a channel being used, but also off-channel scans to determine the activity in other channels, such as off-channel scans in the 2.4 GHz band, which may be needed to detect or "hear" neighbors operating in different channels. For example, data columns may include nodeID, neighborID, RSSI, etc.

Also, the scans may also include a location dimension, which may include latitude, longitude, zip-code, etc. This, for example, may be used for a sanity check to make sure that other nodes of interest for consideration within a cluster are actually in the same state, city, area, neighborhood, etc.

Clustering steps may include data preprocessing. For example, for one day (e.g., yesterday), the nodes may read data from the above two data sources (to consider: read multiple days of data). The node set considered for clustering may include unique gateways in a node dimension. The systems and methods may include filtering the NeighborByPod daily stats, such that, for example, both nodeID and neighborID belong to the above node set. Additional filtering may be based on signal strength, such as an RSSI value being greater than a certain lower threshold (e.g., 10 dBm).

Also, the processes may include eliminating nodes that have a very large number of neighbors, such as a number greater than an upper threshold (e.g., 500).

The optimization processes described herein may also include graphing algorithms. The process may include building a graph (e.g., using Spark GraphFrames library, etc.). The process may use community detection algorithms (e.g., LablePropagation, Louvain, etc.) for identifying clusters. Then, the process can compare clusters against connected components of the graph.

According to one embodiment of a clustering algorithm, the systems and methods of the present disclosure may include a label propagation process. For example, the label propagation process may include a first step of initializing the labels at all nodes in a cluster or network. For a given node x, $C_x(0)=x$. Set t=1. Then, the process includes arranging the nodes in the cluster (network) in a random order and set it to X. For each x∈X chosen in that specific order, let $$C_x(t)=f(C_{i1}(t), \ldots, C_{i(m+1)}(t-1) \ldots, C_{ik(t-1)}))$$

where f returns the label occurring with the highest frequency among neighbors and ties are broken uniformly randomly. Next, if every node has a label that the maximum number of their neighbors have, then the process may stop. Otherwise, the process sets t=t+1 and goes back to the node arranging step.

Figure 25:
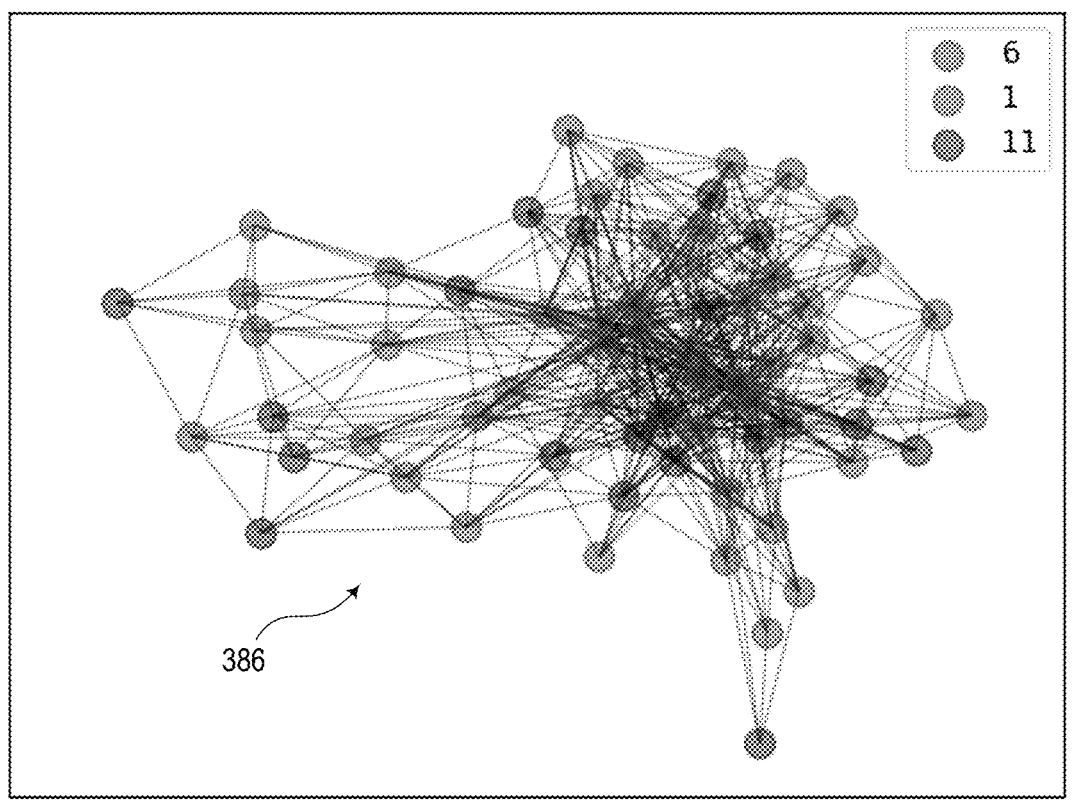
FIG. 25 is a graph showing an example of channel assignment for a single cluster.

The processes may include a modularity metric, such as:

$$Q=\Sigma[(L_c/m)-\gamma(k_c/2m)^2]$$

where a sum iterates over all communities c=1 to n, m is the number of edges, $L_c$ is the number of intra-community links (edges) for community c, $k_c$ is the sum of degrees of the nodes in community c, and γ is the resolution parameter. Coverage may include a ratio of the number of intra-community edges to the total number of edges in the graph. Performance may include the number of intra-community edges plus inter-community non-edges divided by the total number of potential edges FIG. 25 is a graph showing an example of channel assignment for a single cluster 386. The channel assignment may be based on the distance between nodes, which may also be related to the signal strength or power from two adjacent nodes. The channel assignment may also be related to the traffic load that each node may normally utilize, which can be determined from historical data and may be updated as habits change. The channel assignment may also be related to the times of day that different nodes may normally be active. This too may be obtained from historical data and can be updated as habits changes. In this regard, it may be sufficient to have two closely positioned nodes using the same channel if the time-of-day habits of each node do not interfere with each other. Other factors may also be used to optimize the channel assignment to thereby minimize (or at least reduce) the amount of interference among the different nodes within the cluster 386.

Figure 26:
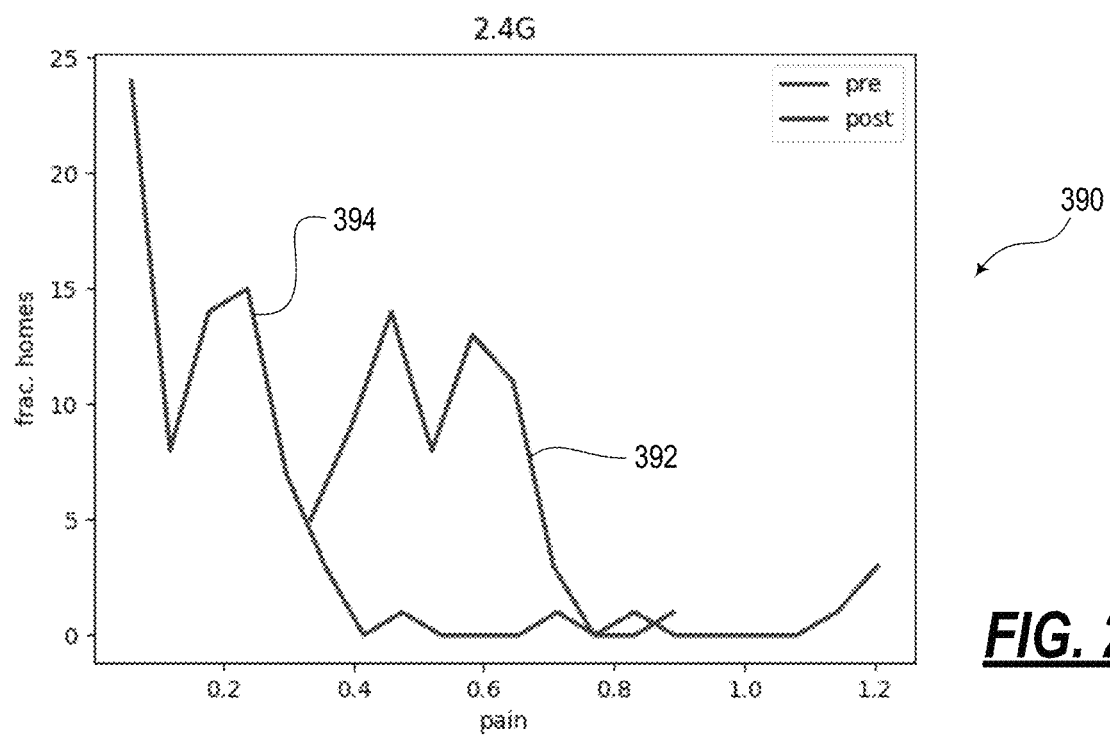
FIG. 26 is a chart showing an example of a test to demonstrate the potential for improvement for the cluster of FIG. 25 using the optimization processes of the present disclosure.

FIG. 26 is a chart 390 showing an example of a test to demonstrate the potential for improvement with respect to the cluster 386 of FIG. 25. For example, before optimization processes described herein, a first graph line 392 is shown, whereby a larger percentage (or fraction) of the homes experience a greater amount of "pain" (or interference) as defined above. However, after the optimization efforts according to the systems and methods of the present disclosure, a second graph line 394 is shown. It should be noted that this test confirms that, after the optimization processes of the present disclosure are executed, a larger percentage of homes experience much less pain (or interference).

Figure 27:
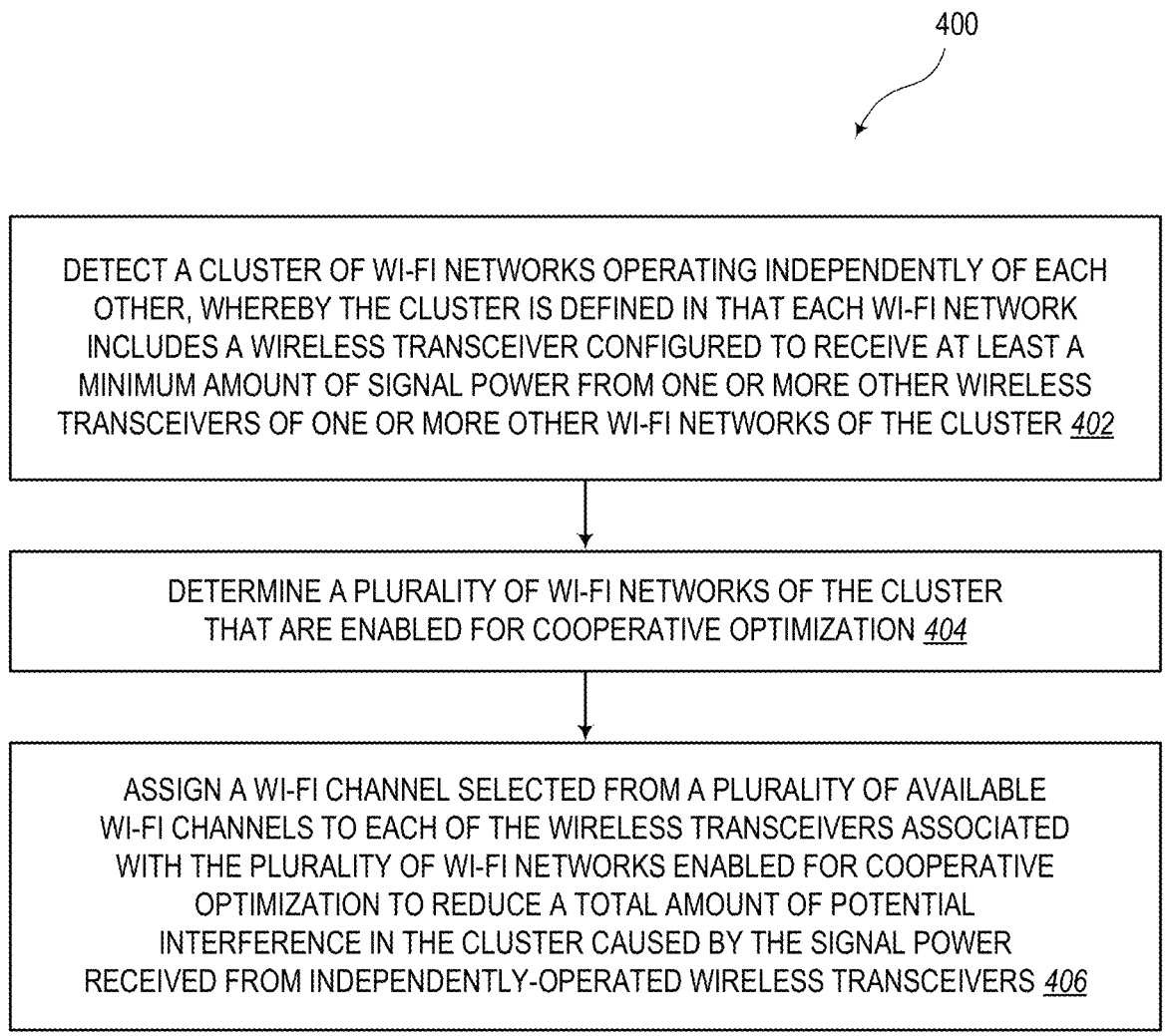
FIG. 27 is a flowchart showing a method for forming clusters and assigning channels to reduce potential signal interference among nearby Wi-Fi systems.

FIG. 27 is a flowchart illustrating an embodiment of a method 400, in general, for optimizing Wi-Fi networks in a cluster. For example, the method 400 may be executed to assign channels in such a way so as to reduce potential signal interference among nearby Wi-Fi systems for optimization. As illustrated, the method 400 includes the step of detecting a cluster of Wi-Fi networks operating independently of each other, as indicated in block 402. The cluster is defined in that each Wi-Fi network includes a wireless transceiver configured to receive at least a minimum amount of signal power from one or more other wireless transceivers of one or more other Wi-Fi networks of the cluster. The method 400 also includes the step of determining a plurality of Wi-Fi networks of the cluster that are enabled for cooperative optimization, as indicated in block 404. Also, the method 400 includes the step of assigning a Wi-Fi channel selected from a plurality of available Wi-Fi channels to each of the wireless transceivers associated with the plurality of Wi-Fi networks enabled for cooperative optimization to reduce a total amount of potential interference in the cluster caused by the signal power received from independently-operated wireless transceivers, as indicated in block 406.

The method 400, for example, may be executed by any suitable control device, such as a cloud-based server or Software-Defined Networking (SDN) controller. The cloud-based server 20 or SDN controller 1010, for example, may be configured to receive, from each Wi-Fi network, identification information of the respective Wi-Fi network and identification information and signal power levels associated with other Wi-Fi networks within range of the respective Wi-Fi network. The cloud-based server or SDN controller may be configured to manage multiple clusters to reduce the total amount of potential interference in each cluster caused by the signal power received from the independently-operated wireless transceivers in the respective cluster. The cloud-based server or SDN controller may be configured to reduce the total amount of potential interference in each cluster further caused by the signal power received from wireless transceivers in other clusters.

In some embodiments, the step of assigning Wi-Fi channels (block 406) may include the steps of obtaining usage parameters associated with each of the Wi-Fi networks in the clusters, the usage parameters including a) an amount of time that the respective Wi-Fi network is used during a predetermined time period, b) a load of data traffic is transmitted within the respective Wi-Fi network during the predetermined time period, and/or c) the times of day when the respective Wi-Fi network is used. The assigning step may then be based on these usage parameters to further reduce the total amount of potential interference in the cluster.

Also, the method 400 of FIG. 27 may further be defined in some embodiments whereby each Wi-Fi network represents a node associated with an independent residence and each Wi-Fi network includes one or more access points. The method 400 may include performing a sequential step of optimizing each independent residence by assigning channels for each of the one or more access points to reduce a total amount of interference within the respective independent residence. The step of determining the plurality of Wi-Fi networks of the cluster that are enabled for cooperative optimization (block 404) may be performed independently of what service provider is associated with each of the Wi-Fi networks of the cluster.

For each pair of adjacent wireless transceivers in the cluster, the method 400 may further is the steps of a) obtaining, from each wireless transceiver of the respective pair of adjacent wireless transceivers, the signal power received from the other wireless transceiver, b) averaging the received signal power of the respective pair, and c) comparing the average with the minimum amount to determine if the received signal power is capable of causing interference between the respective pair. The minimum amount, for example, may be related to a predetermined lower threshold of a metric associated with one or more of a Received Signal Strength Indicator (RSSI), a dBm reading, and a pain metric. Other techniques can be used as well, including in combination with the power. For example, selecting/controlling channel width, BSS Coloring, or TX Power that can be used to influence and reduce the neighboring interference across the cluster of Wi-Fi networks.

The step of assigning the Wi-Fi channels to each of the wireless transceivers (block 406) may further include the steps of a) selecting a primary wireless transceiver from the plurality of wireless transceivers, b) assigning a first Wi-Fi channel to the primary wireless transceiver, c) assigning one or more different Wi-Fi channels to wireless transceivers within range of the primary wireless transceivers, and d) repeating channel assignments for additional wireless transceivers. The primary wireless transceiver may be selected based on one or more of a) network usage with respect to other wireless transceivers, b) a number of other wireless transceivers from which at least the minimum amount of signal power is received, and c) a nearness to a geographical center of the cluster.

The step of detecting the cluster (block 402) may further include the step of balancing a size of the cluster by defining a minimum number of edges that a Wi-Fi network shares with other Wi-Fi networks and by defining the minimum amount of signal power received at each edge. Also, in response to determining that the cluster size is above an upper threshold, the method 400 may perform one or more of the steps of a) increasing the minimum amount of signal power considered to potentially cause interference, b) dividing the cluster into two or more sub-clusters based on locations within the cluster where there are fewer edges, c) dividing the cluster into two or more sub-clusters based on manual input and/or geographical information, etc. In response to determining that the cluster size is below a lower threshold, the method 400 may perform the step of reducing the minimum amount of the signal power considered to potentially cause interference.

In some embodiments, the method 400 may also be defined whereby the plurality of available Wi-Fi channels may include multiple channels from a 2.4 GHz band and a 5 GHz band. The 2.4 GHz band may include at least three channels having minimal overlapping. The step of assigning a Wi-Fi channel to each of the wireless transceivers (block 406) may further include a graph-coloring technique. The method 400 may be further configured to re-assign Wi-Fi channels based on updated information regarding received signal power and additions or subtractions of Wi-Fi networks in the cluster.

Figure 28:
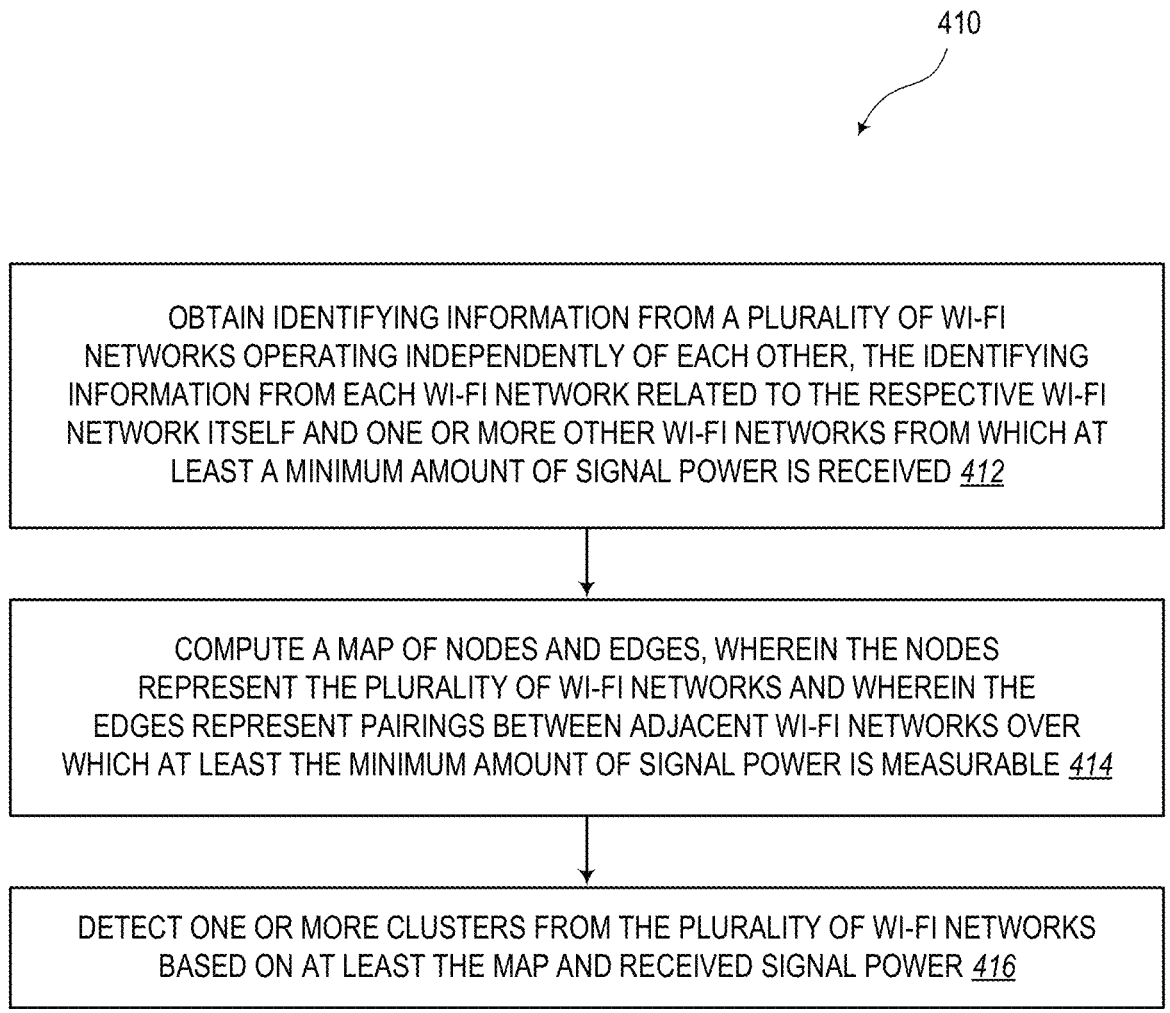
FIG. 28 is a flowchart illustrating an embodiments of a method for performing the clustering algorithms or techniques described herein.

FIG. 28 is a flowchart illustrating an embodiments of a method 410 for performing the clustering algorithms or techniques described herein. In some embodiments, the created cluster or clusters may then be optimized as described throughout the present disclosure. Thus, the method 410 may be generalized clustering process. As illustrated, the method 410 includes a step of obtaining identifying information from a plurality of Wi-Fi networks operating independently of each other, as indicated in block 412. For example, the identifying information from each Wi-Fi network may be related to the respective Wi-Fi network itself and one or more other Wi-Fi networks from which at least a minimum amount of signal power is received. The method 410 also includes the step of computing a map of nodes and edges, as indicated in block 414. The nodes may represent the plurality of Wi-Fi networks and the edges may represent pairings between adjacent Wi-Fi networks over which at least the minimum amount of signal power is measurable. Furthermore, the method 410 in this embodiment may include the step of detecting one or more clusters from the plurality of Wi-Fi networks based on at least the map and received signal power, as indicated in block 416.

Thus, the method 410 may be configured to simply form one or more clusters as needed for grouping related nodes based on edge information. Furthermore, the method 410 may also be applied to the optimization procedures described throughout the present disclosure. Also, the method 410 may be performed by the cloud-based server 20 and/or SDN controller 1010. The method 410 may include an additional step, for example, of determining, for each of the one or more clusters, a set of Wi-Fi networks that is enabled for cooperative optimization and for each of the one or more clusters. The method 410 may also assign a Wi-Fi channel selected from a plurality of available Wi-Fi channels to each of the Wi-Fi networks enabled for cooperative optimization to reduce a total amount of potential interference in the respective cluster caused by the received signal power over the edges.

MDU optimization may include jointly selecting network properties across a set of independent homes. Metrics to be optimized (e.g., minimized) may include a) a number of neighbors on the same frequency channel (e.g., within a reasonable range above a lower threshold and below an upper threshold). This number may include the number of neighbors with signal strength above a certain threshold and/or the number of neighbors weighted by signal strengths. Another metric to be optimized may include an amount of interference, such as a minimized airtime occupied by interference from neighbors. Another metric may include a congestion metric, which may be related to interference, congestion, or the pain metric described herein. This may effectively be the product of the traffic load in one home (e.g., apartment) times the amount of interference that comes into that home from a neighboring home (e.g., apartment). Another metric may include one that considers the usage by time of day. Factoring may include determining when a given network is typically used, and when interference is typically present from a particular neighbor. With respect to any of these metrics, the systems and methods may include minimizing one of a) the average of the metric across the entire cluster, b) the maximum of the metric across the entire cluster, or other suitable analysis. Maximizing channel diversity may include making full and relatively even use of all different channels that are available and/or using a weighted sum of any of the above metrics.

The systems and methods of the present disclosure may use any suitable algorithms or functionality for optimization. For example, some embodiments may initially perform optimization by heuristics or self-discovery, which might not be optimized at first but may include a good approximation that can be improved upon. This may include graph-coloring vertices. Also, some embodiments may include greedy optimization, in which each node is configured to optimize locally in a quick process, which may not necessarily be the best on a global scale (e.g., for an entire cluster). Next, some embodiments may include an iterative process, which may potentially start with random assignments and then fix the areas that have the biggest problems. This may include simulated annealing or meta-heuristics.

Other techniques may include an exhaustive search or brute force method. In some cases, the process may start at a center of a cluster, find a channels at this point, and then proceed outward from there, repeating the channel assignments as appropriate. Some other techniques may include Reinforcement Learning based processes, meta-heuristics (e.g., genetic algorithm, simulated annealing, etc.), hill climbing methods, neighborhood search methods for various sizes of neighborhoods. Some techniques may be formulated as a graph problem with nodes (or vertices) and edges (or wireless interference links).

Furthermore, some methods of optimization may also include techniques that are solved using rigorous optimization methods, such as Mixed Integer Linear Programming (MILP). Also, sequential, hierarchical, or layered optimization may be performed, where processing may be performed first on a cluster level, then the method may proceed to a local level for optimization within each node or Wi-Fi network itself. This sequential process may be performed in which frequency channels are chosen first in a separate step, in which a second local optimization is done on each individual home after the MDU wide optimization, in which the results of the global MDU optimization is passed to the local optimization, and/or in which the results of the global MDU optimization can be considered a suggestion and can be overruled in the local optimization due to other factors. Other methodologies may include any suitable combination of the techniques described above.

The clustering algorithms of the present disclosure may include auto-clustering, which may be based on signal strength of beacons utilized in an AP and/or may be based on air time consumed by neighboring locations for determining which homes should be included in a cluster. Clustering may be based on physical distance, which, in particular, may include using the addresses of the homes. For example, this may include using geographical or GPS detection. In some cases, clustering may include manual entry of data to define clusters. For example, this may be done by an apartment complex manager who can enter the networks that exist within a given apartment complex.

Also, clustering may include a process of adjusting the cluster size. This may be done by a) adjusting the RSSI threshold that is considered to indicate interference, b) adjusting a parameter in the clustering algorithm to drive smaller or larger clusters with more or fewer edges that extend beyond the cluster, etc. For example, this may include cutting off edge connections to keep cluster size within a reasonable size. Also, clustering may include hard-limiting clusters to a particular size. For cluster size, the processes may also include adjusting the number of edges that are allowed to extend beyond the cluster.

A clustering algorithm may be employed, such as one using known clustering techniques (e.g., label propagation, k-means, hierarchical clustering, formulated as an optimization to do clustering, etc.). The algorithms may include creating an optimization problem to do the clustering, greedy clustering, label propagation, iterative clustering, unsupervised clustering methods (e.g., in a Machine Learning system), social networking clustering algorithms, and/or other suitable procedures.

Furthermore, the parameters to be optimized and controls may include any applicable characteristics. For example, some parameters may include a selection of a frequency channel, selection of a channel bandwidth (e.g., 20 MHz, 40 MHz, 80 MHz, or 160 MHz in the 5 GHz frequency band), selection of topology or which AP connects to which in each of the individual apartments. As such, each apartment might have single AP pods or multiple AP devices distributed throughout a home. The parameters may also include selecting client AP steering between APs in a given apartments, selecting client band steering (e.g., should client connect on 2.4 GHz channel or 5 GHz channel), selecting which channels are used for client connect, backhaul connection, or opening the channel to both backhaul and client connection, etc.

It may be noted that, in some embodiments with respect to the systems and methods described herein, the present disclosure may be compared with community Wi-Fi systems where any device associated with any user can access the network using any AP device in the network. This allows user to roam and use whatever works for them. However, according to the embodiments disclosed herein, the systems and methods in contrast allow only users to user their own devices to access their own Wi-Fi network using only with their own AP devices. The optimization processes of the present disclosure, however, go beyond the community Wi-Fi systems but still does not allow someone to use someone else's network.

According to some tests of various existing networks, data was obtained to determine how auto-clustering could be performed. In some cases, certain clusters were found to include more than 1,000 Wi-Fi networks representing 1,000 different customers in proximity to each other. The range of clusters was found to be anywhere from about 30 Wi-Fi networks to about 300 Wi-Fi networks. In other words, smaller clusters were found to be more common. However, there still were enough extremely large clusters that might benefit from reduce the size of the cluster by dividing them into two or more smaller clusters, and so on until a reasonable size is obtained.

The AP devices may be Open Sync devices. However, in this disclosure, only the in-network (e.g., common vendor) can be controlled since other vendors might not provide the same functionality as described in the present disclosure and may not be able to coordinate with the in-network for optimization therewith. However, it should be noted that if the systems and methods of the present disclosure are incorporated into a standard (e.g., IEEE 802.11), more Wi-Fi devices and equipment may be configured to join the optimization strategies described herein.

Nevertheless, even in clusters having in-network and out-of-network devices, it is still possible to detect the inference coming from out-of-network devices. If a neighbor has a different (out-of-network) device, the system cannot change its frequency channel to jointly optimize with them, but the current Wi-Fi network can sense the amount of interference that it is causing in the present home. Thus, optimization may be configured to work around these out-of-network devices. The systems can try to assign channels that are different from these and learn over time the habits of that particular neighbors.

Also, differences in spatial stream count on Tri-Band access points that split up a single band (such as 5 G-Upper and 5 G-Lower) can be handled. For example, tri-band devices can have the 5 GHz band split between two radios. One radio that supports the lower channels (36-64) has 4 antennas and spatial streams while the radio that supports the upper channels (100-165) has 2 antennas and spatial streams. This means you have to take this into account during channel selection as the maximum performance provided to clients will depend on the upper vs. lower channels being selected.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having code stored therein for programming a processing device to perform steps of:
    detecting a cluster of Wi-Fi networks operating independently of each other, whereby the cluster is defined in that each Wi-Fi network includes a wireless transceiver configured to receive at least a minimum amount of signal power from one or more other wireless transceivers of one or more other Wi-Fi networks of the cluster;
    determining a plurality of Wi-Fi networks of the cluster that are enabled for cooperative optimization;
    obtaining usage parameters associated with each of the Wi-Fi networks in the clusters, the usage parameters including a) an amount of time that the respective Wi-Fi network is used during a predetermined time period, b) a load of data traffic that is transmitted within the respective Wi-Fi network during the predetermined time period, and c) the times of day when the respective Wi-Fi network is used;
    assigning a Wi-Fi channel selected from a plurality of available Wi-Fi channels to each of the wireless transceivers associated with the plurality of Wi-Fi networks enabled for cooperative optimization, the assigning of the WiFi channel selected from the plurality of available Wi-Fi channels being based on the obtained usage parameters, such that a total amount of potential interference in the cluster caused by the signal power received from independently-operated wireless transceivers is reduced; and
    iteratively performing the assigning step for Wi-Fi networks having an overlap of their boundaries until no interference between the Wi-Fi networks is present.

2. The non-transitory computer-readable storage medium of claim 1, wherein the non-transitory computer-readable storage medium is incorporated in a cloud-based server or Software-Defined Networking (SDN) controller.

3. The non-transitory computer-readable storage medium of claim 2, wherein the cloud-based server or SDN controller is configured to receive, from each Wi-Fi network, identification information of the respective Wi-Fi network and identification information and signal power levels associated with other Wi-Fi networks within range of the respective Wi-Fi network.

4. The non-transitory computer-readable storage medium of claim 2, wherein the cloud-based server or SDN controller is configured to manage multiple clusters to reduce the total amount of potential interference in each cluster caused by the signal power received from the independently-operated wireless transceivers in the respective cluster.

5. The non-transitory computer-readable storage medium of claim 4, wherein the cloud-based server or SDN controller is configured to reduce the total amount of potential interference in each cluster further caused by the signal power received from wireless transceivers in other clusters.

6. The non-transitory computer-readable storage medium of claim 1, wherein each Wi-Fi network represents a node associated with an independent residence and each Wi-Fi network includes one or more access points, and wherein the code further programs the processing device to perform a sequential step of optimizing each independent residence by assigning channels for each of the one or more access points to reduce a total amount of interference within the respective independent residence.

7. The non-transitory computer-readable storage medium of claim 1, wherein the step of determining the plurality of Wi-Fi networks of the cluster that are enabled for cooperative optimization is performed independently of one or more service providers associated with the Wi-Fi networks of the cluster.

8. The non-transitory computer-readable storage medium of claim 1, wherein the step of assigning the Wi-Fi channels to each of the wireless transceivers includes the steps of:

selecting a primary wireless transceiver from the plurality of wireless transceivers;

assigning a first Wi-Fi channel to the primary wireless transceiver;

assigning one or more different Wi-Fi channels to wireless transceivers within range of the primary wireless transceivers; and repeating channel assignments for additional wireless transceivers.

9. The non-transitory computer-readable storage medium of claim 8, wherein the primary wireless transceiver is selected based on one or more of a) network usage with respect to other wireless transceivers, b) a number of other wireless transceivers from which at least the minimum amount of signal power is received, and/or c) a nearness to a geographical center of the cluster.

10. The non-transitory computer-readable storage medium of claim 1, wherein the step of detecting the cluster further includes the step of balancing a size of the cluster by defining a minimum number of edges that a Wi-Fi network shares with other Wi-Fi networks and by defining the minimum amount of signal power received at each edge.

11. The non-transitory computer-readable storage medium of claim 10, wherein, in response to determining that the cluster size is above an upper threshold, the code further programs the processing device to perform one or more of the steps of:

increasing the minimum amount of signal power considered to potentially cause interference;

dividing the cluster into two or more sub-clusters based on locations within the cluster where there are fewer edges; and dividing the cluster into two or more sub-clusters based on manual input and/or geographical information.

12. The non-transitory computer-readable storage medium of claim 10, wherein, in response to determining that the cluster size is below a lower threshold, the code further programs the processing device to perform the step of reducing the minimum amount of the signal power considered to potentially cause interference.

13. The non-transitory computer-readable storage medium of claim 1, wherein the plurality of available Wi-Fi channels includes multiple channels from a 2.4 GHz band and a 5 GHz band, the 2.4 GHz band including at least three channels having minimal overlapping.

14. The non-transitory computer-readable storage medium of claim 1, wherein the step of assigning a Wi-Fi channel to each of the wireless transceivers includes a graph-coloring technique.

15. The non-transitory computer-readable storage medium of claim 1, wherein the code further programs the processing device to re-assign Wi-Fi channels based on updated information regarding received signal power and additions or subtractions of Wi-Fi networks in the cluster.

16. A method comprising steps of:

detecting a cluster of Wi-Fi networks operating independently of each other, whereby the cluster is defined in that each Wi-Fi network includes a wireless transceiver configured to receive at least a minimum amount of signal power from one or more other wireless transceivers of one or more other Wi-Fi networks of the cluster;

determining a plurality of Wi-Fi networks of the cluster that are enabled for cooperative optimization;

obtaining usage parameters associated with each of the Wi-Fi networks in the clusters, the usage parameters including a) an amount of time that the respective Wi-Fi network is used during a predetermined time period, b) a load of data traffic that is transmitted within the respective Wi-Fi network during the predetermined time period, and c) the times of day when the respective Wi-Fi network is used;

assigning a Wi-Fi channel selected from a plurality of available Wi-Fi channels to each of the wireless transceivers associated with the plurality of Wi-Fi networks enabled for cooperative optimization, the assigning of the WiFi channel selected from the plurality of available Wi-Fi channels being based on the obtained usage parameters, such that a total amount of potential interference in the cluster caused by the signal power received from independently-operated wireless transceivers is reduced;

iteratively performing the assigning step for Wi-Fi networks having an overlap of their boundaries until no interference between the Wi-Fi networks is present.

* * * * *